US012283869B2

(12) United States Patent
Shinohara et al.

(10) Patent No.: US 12,283,869 B2
(45) Date of Patent: Apr. 22, 2025

(54) ROTATING BODY FOR ROTATION RESTRICTING MECHANISM, AND ACTUATOR

(71) Applicant: YAMAHA HATSUDOKI KABUSHIKI KAISHA, Iwata (JP)

(72) Inventors: Koji Shinohara, Shizuoka (JP); Takumi Hirano, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 305 days.

(21) Appl. No.: 17/866,307

(22) Filed: Jul. 15, 2022

(65) Prior Publication Data
US 2022/0352787 A1 Nov. 3, 2022

Related U.S. Application Data

(63) Continuation-in-part of application No. PCT/JP2021/001431, filed on Jan. 18, 2021.

(30) Foreign Application Priority Data

Jan. 17, 2020 (WO) .................. PCT/JP2020/001529

(51) Int. Cl.
*F16D 63/00* (2006.01)
*H02K 7/102* (2006.01)

(52) U.S. Cl.
CPC ........... *H02K 7/102* (2013.01); *F16D 63/006* (2013.01); *F16D 2200/0017* (2013.01); *F16D 2200/0021* (2013.01)

(58) Field of Classification Search
CPC ........... F16D 63/006; F16D 2200/0017; F16D 2200/0021; B25J 9/126; B25J 19/0004;
(Continued)

(56) References Cited

U.S. PATENT DOCUMENTS 5,893,439 A * 4/1999 Park .................... B60T 1/005
192/219.5
6,250,433 B1 * 6/2001 Sealine ................ B60T 1/005
188/69
(Continued)

FOREIGN PATENT DOCUMENTS

CN 106976083 A 7/2017
CN 107005137 A 8/2017
(Continued)

OTHER PUBLICATIONS

International Preliminary Report on Patentability PCT/JP2021/001529 issued on Mar. 9, 2021.
(Continued)

*Primary Examiner* — Thomas W Irvin
(74) *Attorney, Agent, or Firm* — Rabin & Berdo, P.C.

(57) ABSTRACT

A rotating body for a rotation restricting mechanism rotates integrally with a motor, and the rotation of the rotating body is restrictable by engagement with an engaging pin. The rotating body includes a plurality of radial-support parts that extend in a radial direction, with the inner end portions thereof connected to the motor, a plurality of first-circumferential-connecting parts each connecting the inner end portions of two mutually-adjacent radial-support parts, a plurality of second-circumferential-connecting parts each connecting the outer end portions of two mutually-adjacent radial-support parts, and a plurality of engaging protrusions provided in the outer end portions of the radial-support parts. Two mutually-adjacent engaging protrusions in the circumferential direction have an interval therebetween that allows movement of the engaging pin in the circumferential direction between the two mutually-adjacent engaging protrusions.

8 Claims, 13 Drawing Sheets

(58) Field of Classification Search
CPC .. F16H 25/2454; F16H 63/3441; H02K 7/102
See application file for complete search history.

(56) References Cited

U.S. PATENT DOCUMENTS

| | | | |
|---|---|---|---|
| 6,409,002 | B1 | 6/2002 | Orlamünder et al. |
| 9,182,021 | B2 * | 11/2015 | Muramatsu ......... F16H 25/2454 |
| 10,022,861 | B1 | 7/2018 | He et al. |
| 10,967,527 | B2 * | 4/2021 | Shao ..................... B25J 19/066 |
| 11,027,422 | B2 * | 6/2021 | Ayuzawa ................. B25J 9/101 |
| 11,161,258 | B2 * | 11/2021 | Boyland .................. H02K 9/06 |
| 11,806,865 | B2 * | 11/2023 | Ayuzawa ............... F16D 63/006 |
| 11,879,545 | B2 * | 1/2024 | Mariotti ................ F16D 63/006 |
| 2011/0218761 | A1 | 9/2011 | Lingk |
| 2011/0240430 | A1 | 10/2011 | Iwase et al. |
| 2017/0059366 | A1 | 3/2017 | Nishioka et al. |
| 2018/0319012 | A1 | 11/2018 | He et al. |
| 2019/0109549 | A1 * | 4/2019 | Odagiri ................. H02K 24/00 |
| 2020/0039094 | A1 * | 2/2020 | Ayuzawa ............. B25J 19/0004 |
| 2020/0324406 | A1 | 10/2020 | Ayuzawa |
| 2024/0255036 | A1 * | 8/2024 | Camerlengo ............ B25J 9/102 |

FOREIGN PATENT DOCUMENTS

| | | |
|---|---|---|
| CN | 207139843 U | 3/2018 |
| CN | 207824926 U | 9/2018 |
| GB | 2396671 A | 6/2004 |
| JP | S63289417 A | 11/1988 |
| JP | S6474411 A | 3/1989 |
| JP | H06315879 A | 11/1994 |
| JP | H0740269 A | 2/1995 |
| JP | H1038557 A | 2/1998 |
| JP | 2004174704 A | 6/2004 |
| JP | 2005207864 A | 8/2005 |
| JP | 2006329783 A | 12/2006 |
| JP | 2010151269 A | 7/2010 |
| JP | 2011120444 A | 6/2011 |
| JP | 2013035530 A | 2/2013 |
| JP | 2017181235 A | 10/2017 |
| JP | 2017189081 A | 10/2017 |
| JP | 2019113132 A | 7/2019 |
| JP | 2019190520 A | 10/2019 |
| JP | 2019190614 A | 10/2019 |
| JP | 2020122659 A | 8/2020 |
| KR | 100863096 B1 | 10/2008 |
| KR | 1020170053499 A | 5/2017 |
| KR | 1020180060264 A | 6/2018 |
| WO | 2014207846 A1 | 12/2014 |
| WO | 2017169580 A1 | 10/2017 |
| WO | 2018055752 A1 | 3/2018 |
| WO | 2019202912 A1 | 10/2019 |

OTHER PUBLICATIONS

International Preliminary Report on Patentability PCT/JP2020/001526 issued on Feb. 25, 2020.

International Preliminary Report on Patentability PCT/JP2021/001431 issued on Apr. 6, 2021.

International Preliminary Report on Patentability PCT/JP2020/001529 issued on Apr. 7, 2020.

International Preliminary Report on Patentability PCT/JP2020/001531 issued on Mar. 17, 2020.

* cited by examiner

100: ROTATION-RESTRICTING-MECHANISM CONTROL DEVICE
110: ENGAGING-PROTRUSION-POSITION DETECTOR
120: ENGAGING-PIN-MOVEMENT CONTROLLER

30: MULTI-JOINT-ROBOT-ARM CONTROL DEVICE

ROTATING BODY FOR ROTATION RESTRICTING MECHANISM, AND ACTUATOR

CROSS-REFERENCES TO RELATED APPLICATIONS

The present application is a continuation-in-part application of International Application No. PCT/JP2021/001431, filed on Jan. 18, 2021, and having the benefit of the earlier filing date of International Application No. PCT/JP2020/001529, filed on Jan. 17, 2020. The content of each of the identified applications is incorporated herein by reference in its entirety.

TECHNICAL FIELD

The present teaching relates to a rotating body for a rotation restricting mechanism (i.e., a rotation-restricting-mechanism-rotating-body), and an actuator.

BACKGROUND ART

Conventionally, an actuator includes a motor and a rotation restricting mechanism for restricting rotation of the stopped motor. For example, the rotation restricting mechanism disclosed in Patent Document 1 is a mechanism for holding a stopped rotor of the motor at a stopped position thereof. The rotation restricting mechanism includes a flat plate-like and substantially annular rotation restricting member fixed to the rotor, and a fixed restricting member which engages with the rotation restricting member to restrict movement of the rotation restricting member in a circumferential direction of the rotor. The rotation restricting member is fixed to an end portion of a rotation shaft of the motor such that a thickness direction of the rotation restricting member and the vertical direction are coincident with each other. The rotation restricting member includes a plurality of protrusions protruding outwardly in a radial direction formed in a circumferential portion of the annular part that is annularly formed.

The fixed restricting member is formed in a columnar shape having a flange portion at an upper end thereof, and is disposed such that an axial direction of the fixed restricting member and the vertical direction are coincident with each other. The fixed restricting member is disposed on an outer circumferential side of the rotation restricting member such that the flange portion overlaps a virtual circle connecting distal end surfaces of the protrusions of the rotation restricting member, when viewed in the axial direction. The plurality of protrusions provided in the circumferential portion of the annular rotation restricting member engage with the flange portion of the fixed restricting member to thereby restrict rotation of the rotation restricting member.

CITATION LIST

Patent Document

Patent Document 1: International Patent Application Publication No. 2017/169580

SUMMARY OF INVENTION

Technical Problem

In the rotation restricting mechanism described above, rotation of the rotation restricting member is restricted by engagement of the protrusions of the rotation restricting member with the flange portion of the fixed restricting member, in a state where the motor is stopped. That is, in the rotation restricting mechanism, when an external force in a rotation direction acts on the stopped motor, the fixed restricting member comes into contact with the protrusion of the rotation restricting member fixed to the rotor of the motor, thereby restricting rotation of the motor.

The rotation restricting mechanism is not configured with an assumption that the rotation restricting member, while rotating, engages with the fixed restricting member. Thus, the protrusions of the rotation restricting member have lower stiffness than the annular part of the rotation restricting member. Accordingly, when the rotation restricting member engages with the fixed restricting member, a stress is likely to concentrate on the boundary between the disk part and the protrusion in the rotation restricting member. In the rotation restricting mechanism, therefore, the rotation restricting member engages with the fixed restricting member exclusively when the rotation restricting member is stopped or is rotating at close-to-stopping speed, in order to suppress the stress occurring in the rotation restricting member to less than an allowable stress level.

Therefore, in the rotation restricting mechanism that restricts rotation by engagement of the protrusions as described above, there is a demand for a configuration that can operate even in a state where the rotation restricting member is rotating, or in a state where a larger stress occurs in the rotation restricting member.

It is an object of the present teaching to provide a rotating body for a rotation restricting mechanism, capable of expanding the use environment of the rotation restricting mechanism configured to restrict rotation of a rotator by engagement of a fixed restricting member with an engaging protrusion, and an actuator including the rotation restricting mechanism having the rotating body for the rotation restricting mechanism.

Solution to Problem

The inventors of the present teaching studied a configuration of a rotating body for a rotation restricting mechanism to expand the use environment of the rotation restricting mechanism configured to restrict rotation of a rotator by engagement of a fixed restricting member with an engaging protrusion. Through an intensive study, the inventors arrived at the configuration as described below.

A rotation-restricting-mechanism-rotating-body (i.e., a rotating body for a rotation restricting mechanism) according to one embodiment of the present teaching is a rotation-restricting-mechanism-rotating-body configured to rotate integrally with a rotator around a rotation axis, rotation of the rotation-restricting-mechanism-rotating-body being restrictable by engagement with a restricting member movable in an axial direction that is a direction of the rotation axis. The rotation-restricting-mechanism-rotating-body comprises: a plurality of radial-support parts, each extending in a radial direction, and having an inner end portion and an outer end portion respectively at an inner end and an outer end of said each radial-support part in the radial direction, the inner end portions of the radial-support parts being connected to the rotator, so as to rotate integrally with the rotator, each of the radial support parts being of a beam shape; a plurality of first-circumferential-connecting parts, each connecting the inner end portions of two of the radial-support parts that are mutually adjacent, each of the first-circumferential-connecting parts being of a beam shape; a plurality of second-circumferential-connecting parts, each connecting the outer end portions of two of the radial-support parts that are mutually adjacent, each of the second-circumferential-connecting parts being of a beam shape, the plurality of second-circumferential-connecting parts forming a polygonal shape; and a plurality of engaging protrusions, respectively extending outward in the radial direction from the outer end portions of the plurality of radial-support parts. The plurality of engaging protrusions are so formed that an interval between the engaging protrusions that are mutually adjacent in a circumferential direction out of the plurality of engaging protrusions has a distance that, when the restricting member is at a position by which the rotation of the rotation-restricting-mechanism-rotating-body is restrictable, enables relative movement of the restricting member in the circumferential direction between the adjacent engaging protrusions.

In the above-described configuration, the rotation-restricting-mechanism-rotating-body comprises the plurality of beam-shaped radial-support parts extending in a radial pattern, the plurality of beam-shaped first-circumferential-connecting parts connecting the inner end portions of mutually adjacent radial-support parts, the plurality of beam-shaped second-circumferential-connecting parts connecting the outer end portions of mutually adjacent radial-support parts, and the engaging protrusions extending outward in the radial direction from the outer end portions of the radial-support parts. Accordingly, out of the plurality of radial-support parts extending in a radial pattern, mutually adjacent radial-support parts are connected by the first-circumferential-connecting parts and the second-circumferential-connecting parts.

Mutually adjacent radial-support parts are connected by the first-circumferential-connecting parts and the second-circumferential-connecting parts in the manner as described above, and thereby the stiffness of the radial-support parts can be increased. In the rotation-restricting-mechanism-rotating-body, only the inner end portions and the outer end portions of the radial-support parts are connected by the circumferential-connecting parts, so that when an external force is applied to an engaging protrusion, the plurality of second-circumferential-connecting parts connecting the outer end portions of mutually adjacent radial-support parts deform with respect to the plurality of first-circumferential-connecting parts connecting the inner end portions of the mutually adjacent radial-support parts. Accordingly, elastic deformation in the circumferential direction is likely to occur in the radial-support parts of the rotation-restricting-mechanism-rotating-body.

In the rotation-restricting-mechanism-rotating-body configured in this manner, an external force applied to an engaging protrusion is transmitted to the first-circumferential-connecting parts and the second-circumferential-connecting parts that are connected to the radial-support part supporting the engaging protrusion, as well as to the radial-support parts adjacent to the radial-support part. Accordingly, in the rotation-restricting-mechanism-rotating-body, when an external force is applied to the engaging protrusion, a stress occurs not in a concentrated manner, but in such a manner that the stress is distributed to each part of the rotation-restricting-mechanism-rotating-body. Thus, when an external force is applied to the engaging protrusion, stress concentration occurring in a base end portion of the engaging protrusion is alleviated, so that plastic deformation is unlikely to occur in the rotation-restricting-mechanism-rotating-body.

In the rotation-restricting-mechanism-rotating-body, a force acting on one of the radial-support parts is distributed to, and received by, the first-circumferential-connecting parts, the second-circumferential-connecting parts, and the radial-support parts adjacent to the radial-support part. In the rotation-restricting-mechanism-rotating-body, elastic deformation occurs in the first-circumferential-connecting parts, the second-circumferential-connecting parts, and the adjacent radial-support parts. Accordingly, the rotation-restricting-mechanism-rotating-body reduces an impact force caused when an external force is applied to the engaging protrusion, by the elastic deformation of the first-circumferential-connecting parts, the second-circumferential-connecting parts and the adjacent radial-support parts.

In the rotation-restricting-mechanism-rotating-body, mutually adjacent beam-shaped radial-support parts are connected by the beam-shaped first-circumferential-connecting parts and the beam-shaped second-circumferential-connecting parts. Therefore, the portions surrounded by the radial-support parts, the first-circumferential-connecting parts and the second-circumferential-connecting parts form openings in which no materials for the rotation-restricting-mechanism-rotating-body are present. Therefore, the weight of the rotation-restricting-mechanism-rotating-body is reduced compared with a rotation-restricting-mechanism-rotating-body having a disk shape with no openings. That is, the moment of inertia of the rotation-restricting-mechanism-rotating-body is smaller than the moment of inertia of a rotation-restricting-mechanism-rotating-body having a disk shape with no openings. Accordingly, the rotation-restricting-mechanism-rotating-body can suppress an impact force caused when the restricting member engages with an engaging protrusion of the rotation-restricting-mechanism-rotating-body, compared with a rotation-restricting-mechanism-rotating-body having a disk shape with no openings.

The plurality of beam-shaped second-circumferential-connecting parts connect the outer end portions of the mutually adjacent radial-support parts, to thereby form a polygonal shape. When an engaging protrusion of the rotation-restricting-mechanism-rotating-body engages with the restricting member, the maximum stress occurs in a peripheral area of the engaging protrusion in the rotation-restricting-mechanism-rotating-body. Portions less likely to affect the strength of the peripheral areas of the engaging protrusions in the rotation-restricting-mechanism-rotating-body form a polygonal shape by the plurality of beam-shaped second-circumferential-connecting parts as described above, so that weight reduction of the rotation-restricting-mechanism-rotating-body can be achieved, while suppressing degradation in strength of the rotation-restricting-mechanism-rotating-body. Therefore, the moment of inertia of the rotation-restricting-mechanism-rotating-body is reduced, and thereby an impact force caused when the rotation-restricting-mechanism-rotating-body engages with the restricting member can be reduced.

In the configuration described above, an interval between engaging protrusions mutually adjacent in the circumferential direction has a distance that enables relative movement of the restricting member in the circumferential direction between the mutually adjacent engaging protrusions. Accordingly, in a state where the rotation-restricting-mechanism-rotating-body is rotating, and when the restricting member engages with an engaging protrusion, a possibility of offset collision of the restricting member with the engaging protrusion can be reduced, compared with a case where the distance between the engaging protrusions mutually adjacent in the circumferential direction is small. This is conducive to enhanced life of the restricting member and the engaging protrusions. The offset collision refers to a state where the restricting member makes contact with an intermediate portion in the protruding direction of the engaging protrusion.

With the configuration described above, the rotation-restricting-mechanism-rotating-body can be used in portions that a stronger force acts on, or enables the engagement with the restricting member in a state where the rotator is not stopped. Accordingly, the rotation-restricting-mechanism-rotating-body can expand the use environment of the rotation restricting mechanism that restricts rotation by the engagement of the engaging protrusion with the restricting member.

According to another aspect, the rotation-restricting-mechanism-rotating-body according to the present teaching includes the following configuration. The polygonal shape is a triangle, a square, a pentagon, or a hexagon.

This can achieve further weight reduction of the rotation-restricting-mechanism-rotating-body, so that the moment of inertia of the rotation-restricting-mechanism-rotating-body is reduced and an impact force caused when the rotation-restricting-mechanism-rotating-body engages with the restricting member is further reduced.

The plurality of beam-shaped second-circumferential-connecting parts thus form the polygonal shape from a triangle to a hexagon, which serves to widen an interval between engaging protrusions mutually adjacent in the circumferential direction, compared with a polygonal shape of a heptagon or having more vertices. Thus, the possibility of occurrence of the above-described offset collision can be further reduced.

According to another aspect, the rotation-restricting-mechanism-rotating-body according to the present teaching includes the following configuration. An interval between said two of the engaging protrusions that are mutually adjacent is larger than a sum of a maximum dimension of the restricting member in the circumferential direction when the restricting member is viewed in the axial direction and a width of each of the engaging protrusions in the circumferential direction.

Accordingly, it is possible to reduce the moment of inertia of the rotation-restricting-mechanism-rotating-body, as well as to increase the interval between the engaging protrusions mutually adjacent in the circumferential direction. Thus, an impact force caused when the rotation-restricting-mechanism-rotating-body engages with the restricting member is reduced, and the possibility of occurrence of the above-described offset collision can be further reduced.

According to another aspect, the rotation-restricting-mechanism-rotating-body according to the present teaching includes the following configuration. Each of the engaging protrusions is so formed to extend in the axial direction from the outer end portion of one of the radial-support parts.

The plurality of engaging protrusions extend in the axial direction as described above, so that it is possible to reduce the radius of the rotation-restricting-mechanism-rotating-body. In addition, the rotation restricting mechanism can enhance design flexibility of the restricting member that engages with the engaging protrusion. Accordingly, the rotation-restricting-mechanism-rotating-body can expand the use environment of the rotation restricting mechanism that restricts rotation by the engagement of the engaging protrusion.

According to another aspect, the rotation-restricting-mechanism-rotating-body according to the present teaching includes the following configuration. A width of each of the first-circumferential-connecting parts and each of the second-circumferential-connecting parts, in the radial direction, is smaller than an interval in the radial direction between one of the first-circumferential-connecting parts and one of the second-circumferential-connecting parts.

As described above, the rotation-restricting-mechanism-rotating-body includes openings formed by the radial-support parts, the first-circumferential-connecting parts and the second-circumferential-connecting parts, and each of the openings is larger in the radial direction than the widths of the respective circumferential-connecting parts in the radial direction.

Accordingly, when an external force is applied to an engaging protrusion in the rotation-restricting-mechanism-rotating-body, elastic deformation occurs in the first-circumferential-connecting parts, the second-circumferential-connecting parts and the adjacent radial-support parts. At that time, the stiffness in a portion, of the radial-support part, to which neither the first-circumferential-connecting part nor the second-circumferential-connecting part is connected, is less than the stiffness in portions to which the first-circumferential-connecting part and the second-circumferential-connecting part are connected. Therefore, in the radial-support part, larger elastic deformation occurs in the portion to which neither the first-circumferential-connecting part nor the second-circumferential-connecting part is connected than in the portions to which the first-circumferential-connecting part and the second-circumferential-connecting part are connected.

In the rotation-restricting-mechanism-rotating-body, the external force acting on the engaging protrusion is distributed to the first-circumferential-connecting parts, the second-circumferential-connecting parts and the adjacent radial-support parts. Furthermore, in the radial-support part, stress concentration on the portions to which the first-circumferential-connecting part and the second-circumferential-connecting part are connected, is alleviated by the elastic deformation in the portion to which neither the first-circumferential-connecting part nor the second-circumferential-connecting part is connected. Thus, the rotation-restricting-mechanism-rotating-body can reduce a stress value in each part of the rotation-restricting-mechanism-rotating-body, and therefore, is less likely to undergo plastic deformation. Therefore, the rotation-restricting-mechanism-rotating-body can expand the use environment of the rotation restricting mechanism that restricts rotation by the engagement of the engaging protrusion.

According to another aspect, an actuator according to the present teaching includes the following configuration. The actuator comprises: the rotator; an engaging pin that is the restricting member; an engaging-protrusion-position detector that detects a position of at least one of the engaging protrusions; and an engaging-pin-moving device that moves the engaging pin in the axial direction with respect to the rotation-restricting-mechanism-rotating-body, in accordance with the position of the at least one of the engaging protrusions detected by the engaging-protrusion-position detector.

This ensures more stable engagement between the restricting member and the engaging protrusion. Thus, the possibility of offset collision of the restricting member with the engaging protrusion can be reduced.

According to another aspect, an actuator according to the present teaching includes the following configuration. An actuator comprises: the rotator; and an engaging pin that is the restricting member, wherein the engaging pin includes an impact reducer that reduces an impact caused by contact with one of the engaging protrusions, the rotation-restricting-mechanism-rotating-body is connected to a rotation shaft of the rotator and rotation of the rotation shaft is restricted by engagement of one of the engaging protrusions with the engaging pin.

As described above, the actuator is configured to cause the engaging protrusion to engage with the engaging pin including the impact reducer, to thereby restrict rotation of the rotation-restricting-mechanism-rotating-body. Accordingly, the actuator allows the impact reducer to reduce an impact caused in the engaging protrusion by the contact of the engaging pin with the engaging protrusion of the rotation-restricting-mechanism-rotating-body. In the rotation-restricting-mechanism-rotating-body, the engaging pin includes the impact reducer, so that the stress occurring in the engaging protrusion contacted by the engaging pin is reduced. Therefore, the actuator can expand the use environment of the rotation restricting mechanism that restricts rotation by the engagement of the engaging protrusion.

According to another aspect, an actuator according to the present teaching includes the following configuration. The actuator comprises: the rotator; and an engaging pin that is the restricting member, wherein the rotation-restricting-mechanism-rotating-body includes a rotation impact reducer that reduces an impact caused by contact with the engaging pin, the rotation-restricting-mechanism-rotating-body is connected to a rotation shaft of the rotator, and rotation of the rotation shaft is restricted by engagement of one of the engaging protrusions with the engaging pin.

As described above, the actuator is configured to cause the rotation-restricting-mechanism-rotating-body including the rotation impact reducer to make contact with the engaging pin, to thereby restrict rotation of the rotation-restricting-mechanism-rotating-body. Accordingly, the actuator allows the rotation impact reducer to reduce an impact caused in the engaging protrusion by the contact of the engaging pin with the engaging protrusion of the rotation-restricting-mechanism-rotating-body. The rotation-restricting-mechanism-rotating-body includes the rotation impact reducer, so that the stress occurring in the engaging protrusion contacted by the engaging pin is reduced. Therefore, the actuator can expand the use environment of the rotation restricting mechanism that restricts rotation by the engagement of the engaging protrusion.

The terminology used herein is for the purpose of describing particular embodiments only and is not intended to be limiting of the invention.

As used herein, the term "and/or" includes any and all combinations of one or more of the associated listed items.

It will be further understood that the terms "including," "comprising" or "having" and variations thereof when used in this specification, specify the presence of stated features, steps, elements, components, and/or their equivalents but do not preclude the presence or addition of one or more steps, operations, elements, components, and/or groups thereof.

It will be further understood that the terms "mounted," "connected," "coupled," and/or their equivalents are used broadly and encompass both direct and indirect mounting, connecting and coupling. Further, "connected" and "coupled" are not restricted to physical or mechanical connections or couplings, and can include connections or couplings, whether direct or indirect.

Unless otherwise defined, all terms (including technical and scientific terms) used herein have the same meaning as commonly understood by one having ordinary skill in the art to which this invention belongs.

It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

An embodiment of a rotation-restricting-mechanism-rotating-body, and an actuator including a rotation restricting mechanism having the rotation-restricting-mechanism-rotating-body, according to the present teaching, will be herein described.

In the following description, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

[Multi-Joint Robot Arm]

A multi-joint robot arm herein refers to a robot arm including a plurality of joint portions that connect a plurality of links. The multi-joint robot arm includes a vertical multi-joint robot arm. Specifically, the vertical multi joint robot arm is a robot arm of a serial link mechanism in which links are connected in series from a root to a tip end via rotary joints or prismatic joints of one degree of freedom. The vertical multi joint robot arm includes a plurality of joint portions.

[Rotation Restricting Mechanism]

A rotation restricting mechanism herein refers to a mechanism for restricting rotation of a rotator such as a motor. The rotation restricting mechanism includes a rotation restricting member that is fixed to the rotator, and a fixed restricting member that is fixed to a fixed member. The rotation restricting mechanism is configured to restrict rotation of the rotation restricting member by the fixed restricting member.

[Rotation-Restricting-Mechanism-Rotating-Body]

A rotation-restricting-mechanism-rotating-body (i.e., a rotating body for a rotation restricting mechanism) herein is the rotation restricting member included in the rotation restricting mechanism. The rotation-restricting-mechanism-rotating-body is fixed to the rotator, and rotates integrally with the rotator.

[Radial Center]

A radial center herein refers to a point of intersection of a plurality of members disposed in a radial pattern if these members are radially extended.

[Use Environment]

Use environment herein refers to a state of surroundings and a state of the rotation restricting mechanism when the rotation restricting mechanism restricts rotation of the rotator. Specifically, the use environment includes a space in which the rotation restricting mechanism is disposed, a configuration of the rotation restricting mechanism, a speed of the rotator whose rotation is restricted by the rotation restricting mechanism, acceleration of the rotator, and mass of the rotator. The use environment also includes a state of an external force applied to the rotation-restricting-mechanism-rotating-body, and a state of a stress occurring in the rotation-restricting-mechanism-rotating-body.

[Interval Between Adjacent Engaging Protrusions]

An interval between mutually adjacent engaging protrusions herein refers to, for example, an interval between tip end portions in protruding directions of engaging protrusions mutually adjacent in a circumferential direction. The interval may be, for example, an interval between base end portions in the protruding directions of the engaging protrusions mutually adjacent in the circumferential direction. The interval may be, for example, an interval between central portions in the protruding directions of the engaging protrusions mutually adjacent in the circumferential direction.

[Maximum Dimension of Fixed Restricting Member in Circumferential Direction]

A maximum dimension of the fixed restricting member in a circumferential direction herein refers to a maximum dimension of the fixed restricting member in the circumferential direction of the rotation-restricting-mechanism-rotating-body, when the fixed restricting member is viewed in an axial direction of a rotation axis of the rotation-restricting-mechanism-rotating-body.

[Width of Engaging Protrusion in Circumferential Direction]

A width of the engaging protrusion in a circumferential direction herein refers to, for example, a width in the circumferential direction of the tip end portion in the protruding direction of the engaging protrusion. The width of the engaging protrusion in the circumferential direction may be, for example, a width in the circumferential direction of the base end portion in the protruding direction of the engaging protrusion. The width of the engaging protrusion in the circumferential direction may be, for example, a width in the circumferential direction of the central portion in the protruding direction of the engaging protrusion.

Advantageous Effects of Invention

According to one embodiment of the present teaching, it is possible to provide a rotation-restricting-mechanism-rotating-body capable of expanding the use environment of a rotation restricting mechanism configured to restrict rotation of a rotator by engagement of a fixed restricting member with an engaging protrusion, and an actuator including the rotation restricting mechanism having the rotation-restricting-mechanism-rotating-body.

DESCRIPTION OF EMBODIMENT

Figure 1:
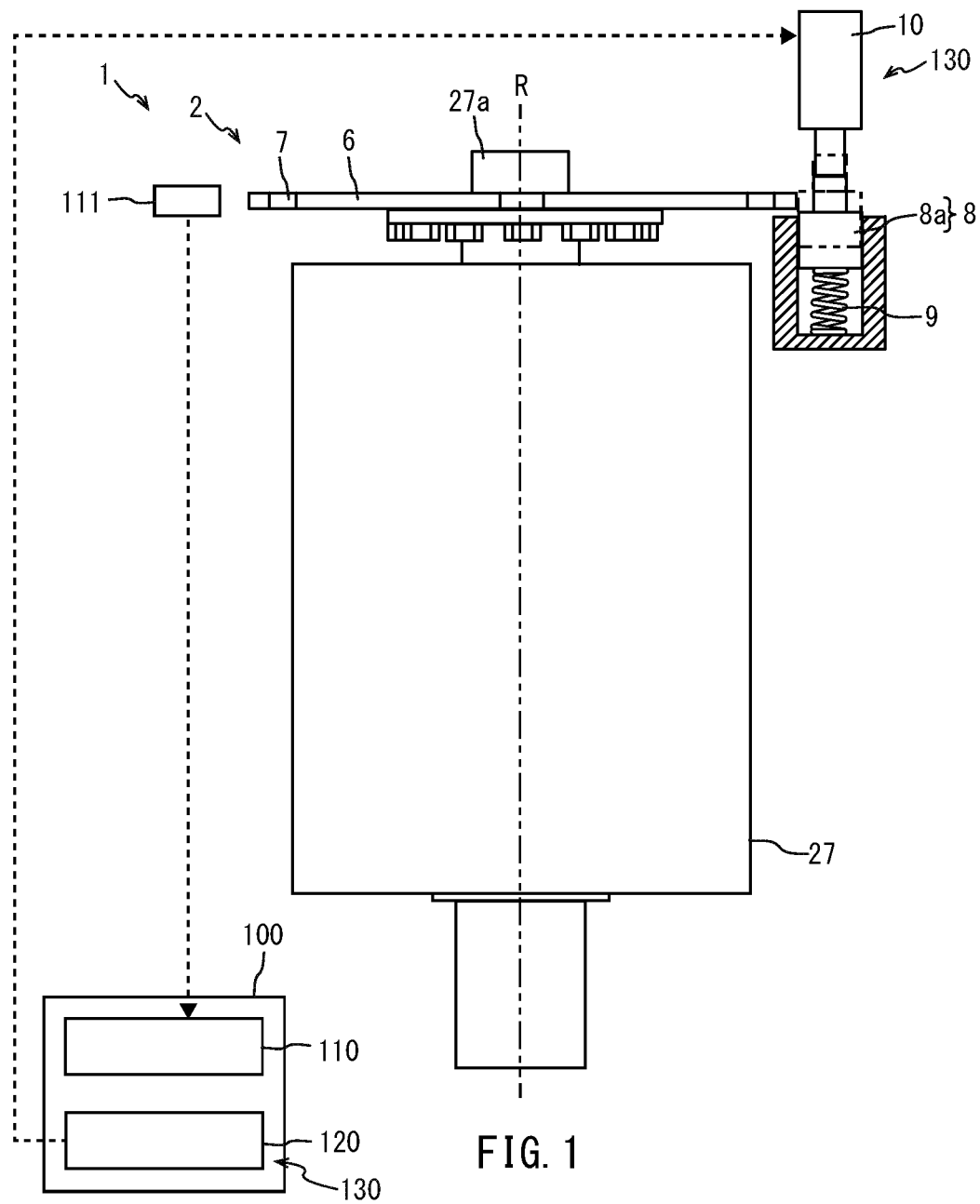
FIG. 1 is a side view of a rotation restricting mechanism according to a first embodiment of the present teaching.

Embodiments will be described hereinafter with reference to the drawings. In the drawings, the same or corresponding parts are denoted by the same reference numerals, and description thereof will not be repeated. The dimensions of components in the drawings do not strictly represent actual dimensions of the components and dimensional proportions of the components, for example.

First Embodiment

<Overall Configuration of Rotation Restricting Mechanism 1>

Figure 2:
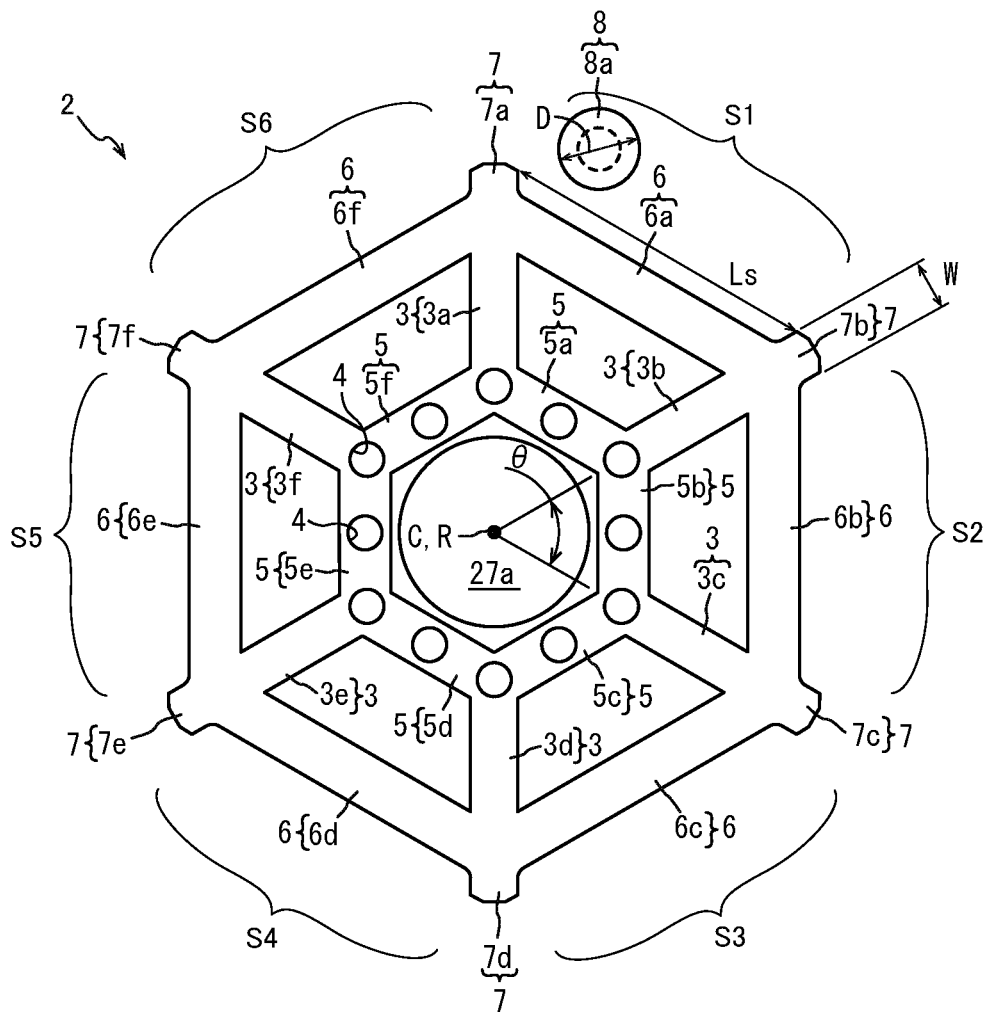
FIG. 2 is a plan view of a rotation-restricting-mechanism-rotating-body according to the first embodiment of the present teaching.

An overall configuration of a rotation restricting mechanism 1 according to a first embodiment of the present teaching is now described with reference to FIG. 1 and FIG. 2. FIG. 1 is a side view of the rotation restricting mechanism 1 according to the first embodiment of the present teaching. FIG. 2 is a plan view of a rotation-restricting-mechanism-rotating-body 2 (i.e., a rotating body for the rotation restricting mechanism) according to the first embodiment of the present teaching.

As shown in FIG. 1, the rotation restricting mechanism 1 is a brake mechanism for restricting rotation of a motor 27 in a case where an electric current is not supplied to the motor 27 that is a rotator, or in a case where the motor 27 does not output a torque. The rotation restricting mechanism 1 includes the rotation-restricting-mechanism-rotating-body 2 as a rotation restricting member, an engaging pin 8 as a fixed restricting member, a solenoid 10, and a rotation-restricting-mechanism control device 100. The rotation restricting mechanism 1 restricts rotation of a rotation shaft 27a of the motor 27 by causing the engaging pin 8 to engage with the rotation-restricting-mechanism-rotating-body 2 that rotates integrally with the rotation shaft 27a of the motor 27.

As shown in FIG. 2, the rotation-restricting-mechanism-rotating-body 2 is a frame-like member rotating integrally with the rotation shaft 27a of the motor 27. The rotation-restricting-mechanism-rotating-body 2 is of a polygonal shape (a hexagon in an example of FIG. 2) when viewed in an axial direction of the rotation shaft 27a (hereinafter also referred to simply as the axial direction). As will be described later, when an engaging protrusion 7 of the rotation-restricting-mechanism-rotating-body 2 engages with the engaging pin 8, the maximum stress occurs in a peripheral area of the engaging protrusion 7 in the rotation-restricting-mechanism-rotating-body 2. Portions less likely to affect the strength of the peripheral areas of the engaging protrusions 7 in the rotation-restricting-mechanism-rotating-body 2, form a polygonal shape, so that weight reduction of the rotation-restricting-mechanism-rotating-body 2 can be achieved, while suppressing degradation in strength of the rotation-restricting-mechanism-rotating-body 2. By reducing the weight of the rotation-restricting-mechanism-rotating-body 2 in this manner, the moment of inertia of the rotation-restricting-mechanism-rotating-body 2 is reduced, and thereby an impact force caused when the rotation-restricting-mechanism-rotating-body 2 engages with the engaging pin 8 can be reduced.

The rotation-restricting-mechanism-rotating-body 2 is made of stainless steel having rust-proof property, for example. The rotation-restricting-mechanism-rotating-body 2 is provided to the rotation shaft 27a of the motor 27, one end portion of the rotation shaft 27a serving as an output shaft and the other end portion thereof being provided with the rotation-restricting-mechanism-rotating-body 2. The rotation-restricting-mechanism-rotating-body 2 includes a plurality of radial-support parts 3, a plurality of first-circumferential-connecting parts 5, a plurality of second-circumferential-connecting parts 6, and the plurality of engaging protrusions 7 as the rotation-restricting members.

Each of the radial-support parts 3 supports each of the engaging protrusions 7. The plurality of radial-support parts 3 are formed like a frame. The plurality of radial-support parts 3 are disposed in a radial pattern, with a rotation axis R that is the shaft center of the rotation shaft 27a as a radial center C. That is, the plurality of radial-support parts 3 are so disposed that all of the radial-support parts 3 intersect at the radial center C if they are extended toward the radial center C. In addition, the plurality of radial-support parts 3 are so disposed that all of center angles θ, each made by mutually adjacent radial-support parts 3, are equal. Longitudinal directions of the plurality of radial-support parts 3 coincide with a radial direction of the rotation-restricting-mechanism-rotating-body 2.

The rotation-restricting-mechanism-rotating-body 2 according to this embodiment has six radial-support parts 3 so disposed, for example, that the center angles θ, each made by mutually adjacent radial-support parts 3, are 60 degrees. The plurality of radial-support parts 3 include a first radial-support part 3a, a second radial-support part 3b, a third radial-support part 3c, a fourth radial-support part 3d, a fifth radial-support part 3e, and a sixth radial-support part 3f, which are arranged in this order in one circumferential direction (i.e., in one direction along the circumference).

The plurality of radial-support parts 3 have the same length in the longitudinal direction (the radial direction of the rotation-restricting-mechanism-rotating-body 2), the same width in a lateral direction (the circumferential direction of the rotation-restricting-mechanism-rotating-body 2), and the same thickness in their plate-shaped members. The plurality of radial-support parts 3 thus having the same shape have the same stiffness and strength.

Each of the first-circumferential-connecting parts 5 connects, out of the plurality of radial-support parts 3, mutually adjacent radial-support parts 3. The plurality of first-circumferential-connecting parts 5 are formed like a frame. The plurality of first-circumferential-connecting parts 5 have the same length in a longitudinal direction (the circumferential direction of the rotation-restricting-mechanism-rotating-body 2), the same width in a lateral direction (the radial direction of the rotation-restricting-mechanism-rotating-body 2), and the same thickness in their plate-like members.

The plurality of first-circumferential-connecting parts 5 connect inner end portions of mutually adjacent radial-support parts 3 so as to form a polygonal shape (a hexagon in this embodiment). In this embodiment, the plurality of first-circumferential-connecting parts 5 include a first first-circumferential-connecting part 5a, a second first-circumferential-connecting part 5b, a third first-circumferential-connecting part 5c, a fourth first-circumferential-connecting part 5d, a fifth first-circumferential-connecting part 5e, and a sixth first-circumferential-connecting part 5f, which are arranged in this order in the one circumferential direction.

The first first-circumferential-connecting part 5a connects an inner end portion of the first radial-support part 3a and an inner end portion of the second radial-support part 3b. Likewise, the second first-circumferential-connecting part 5b connects the inner end portion of the second radial-support part 3b and an inner end portion of the third radial-support part 3c. Likewise, the third first-circumferential-connecting part 5c connects the inner end portion of the third radial-support part 3c and an inner end portion of the fourth radial-support part 3d. Likewise, the fourth first-circumferential-connecting part 5d connects the inner end portion of the fourth radial-support part 3d and an inner end portion of the fifth radial-support part 3e. Likewise, the fifth first-circumferential-connecting part 5e connects the inner end portion of the fifth radial-support part 3e and an inner end portion of the sixth radial-support part 3f. Likewise, the sixth first-circumferential-connecting part 5f connects the inner end portion of the sixth radial-support part 3f and the inner end portion of the first radial-support part 3a. In this manner, the plurality of first-circumferential-connecting parts 5 connect the inner end portions of mutually adjacent radial-support parts 3 in sequence, to thereby form a polygonal, frame-like member, connecting the plurality of radial-support parts 3.

The plurality of first-circumferential-connecting parts 5 are provided with a plurality of fixed parts 4 connected to the rotation shaft 27a of the motor 27. The plurality of fixed parts 4 are fixed to the rotation shaft 27a of the motor 27 in a manner not to rotate relative thereto, so that the plurality of radial-support parts 3 connected by the plurality of first-circumferential-connecting parts 5 are more firmly fixed to the rotation shaft 27a of the motor 27. Accordingly, an external force applied to the radial-support parts 3 can be transmitted to the rotation shaft 27a of the motor 27. In the case where the plurality of fixed parts 4 are fixed to the rotation shaft 27a of the motor 27 in the manner not to rotate relative thereto, deflection or stress that occurs in a radial-support part 3 to which an external force is applied is similar in all of the radial-support parts 3.

The plurality of second-circumferential-connecting parts 6 connect, out of the plurality of radial-support parts 3, mutually adjacent radial-support parts 3, and form a frame-like member. The plurality of second-circumferential-connecting parts 6 have the same length in a longitudinal direction (the circumferential direction of the rotation-restricting-mechanism-rotating-body 2), the same width in a lateral direction (the radial direction of the rotation-restricting-mechanism-rotating-body 2), and the same thickness in their plate-like members.

The plurality of second-circumferential-connecting parts 6, respectively, connect mutually adjacent radial-support parts 3. The plurality of second-circumferential-connecting parts 6 connect outer end portions of the radial-support parts 3, which are end portions located outermost in the radial direction of the rotation-restricting-mechanism-rotating-body 2, so as to form a polygonal shape (a hexagon in this embodiment). That is, the plurality of second-circumferential-connecting parts 6 are connected to the radial-support parts 3 at radial positions different from radial positions at which the first-circumferential-connecting parts 5 are connected.

It is preferable that the plurality of second-circumferential-connecting parts 6 connect the outer end portions of mutually adjacent radial-support parts 3 to thereby form a polygonal shape from a triangle to a hexagon. This can achieve further weight reduction of the rotation-restricting-mechanism-rotating-body 2, so that the moment of inertia of the rotation-restricting-mechanism-rotating-body 2 is further reduced and an impact force caused when the rotation-restricting-mechanism-rotating-body 2 engages with the engaging pin 8 is further reduced.

Furthermore, the plurality of second-circumferential-connecting parts 6 thus form a polygonal shape from a triangle to a hexagon, which serves to widen an interval between the engaging protrusions 7 mutually adjacent in the circumferential direction, compared with a polygonal shape of a heptagon or having more vertices. Therefore, a possibility of offset collision between the engaging pin 8 and the engaging protrusion 7 can be further reduced. The offset collision refers to a state where the engaging pin 8 makes contact with an intermediate portion in the protruding direction of the engaging protrusion 7.

In this embodiment, the plurality of second-circumferential-connecting parts 6 include a first second-circumferential-connecting part 6a, a second second-circumferential-connecting part 6b, a third second-circumferential-connecting part 6c, a fourth second-circumferential-connecting part 6d, a fifth second-circumferential-connecting part 6e, and a sixth second-circumferential-connecting part 6f, which are arranged in this order in the one circumferential direction.

The first second-circumferential-connecting part 6a connects an outer end portion of the first radial-support part 3a and an outer end portion of the second radial-support part 3b. Likewise, the second second-circumferential-connecting part 6b connects the outer end portion of the second radial-support part 3b and an outer end portion of the third radial-support part 3c. Likewise, the third second-circumferential-connecting part 6c connects the outer end portion of the third radial-support part 3c and an outer end portion of the fourth radial-support part 3d. Likewise, the fourth second-circumferential-connecting part 6d connects the outer end portion of the fourth radial-support part 3d and an outer end portion of the fifth radial-support part 3e. Likewise, the fifth second-circumferential-connecting part 6e connects the outer end portion of the fifth radial-support part 3e and an outer end portion of the sixth radial-support part 3f. Likewise, the sixth second-circumferential-connecting part 6f connects the outer end portion of the sixth radial-support part 3f and the outer end portion of the first radial-support part 3a. In this manner, the plurality of second-circumferential-connecting parts 6 connect the outer end portions of mutually adjacent radial-support parts 3 in sequence, to thereby form a polygonal, frame-like member, connecting the plurality of radial-support parts 3.

In a case where the plurality of fixed parts 4 are fixed to the rotation shaft 27a of the motor 27, and when an external force is applied to a radial-support part 3, the second-circumferential-connecting parts 6 connected to the radial-support part 3 transmit the external force to two other radial-support parts 3 adjacent to the radial-support part 3.

Each of the engaging protrusions 7 extends outwardly in the radial direction from each of the radial-support parts 3 so as to be engageable with the engaging pin 8. That is, the plurality of engaging protrusions 7 are so formed to extend outwardly in the radial direction from the outer end portions of the plurality of the radial-support parts 3. Thus, the plurality of engaging protrusions 7 are provided at equal intervals in the circumferential direction in the rotation-restricting-mechanism-rotating-body 2. In addition, each of the engaging protrusions 7 is so formed to extend outwardly in the radial direction from an outer end in the radial direction of each of the second-circumferential-connecting parts 6, i.e., an outer end in the radial direction of the rotation-restricting-mechanism-rotating-body 2 (hereinafter referred to simply as "outer end"). Each of the plurality of engaging protrusions 7 is supported by corresponding one of the plurality of radial-support parts 3 and corresponding ones of the plurality of second-circumferential-connecting parts 6. Any one of the plurality of engaging protrusions 7 engages with the engaging pin 8, and thereby rotation of the rotation-restricting-mechanism-rotating-body 2 can be restricted.

In this embodiment, the plurality of engaging protrusions 7 include a first engaging protrusion 7a, a second engaging protrusion 7b, a third engaging protrusion 7c, a fourth engaging protrusion 7d, a fifth engaging protrusion 7e, and a sixth engaging protrusion 7f, which are arranged in this order in the one circumferential direction. Accordingly, the rotation-restricting-mechanism-rotating-body 2 is formed with a plurality of sections, each separated by mutually adjacent engaging protrusions out of the plurality of engaging protrusions 7. For example, a section separated by the first engaging protrusion 7a and the second engaging protrusion 7b is a first section S1. A section separated by the second engaging protrusion 7b and the third engaging protrusion 7c is a second section S2. A section separated by the third engaging protrusion 7c and the fourth engaging protrusion 7d is a third section S3. A section separated by the fourth engaging protrusion 7d and the fifth engaging protrusion 7e is a fourth section S4. A section separated by the fifth engaging protrusion 7e and the sixth engaging protrusion 7f is a fifth section S5. A section separated by the sixth engaging protrusion 7f and the first engaging protrusion 7a is a sixth section S6.

In this embodiment, as shown in FIG. 2, an interval Ls between mutually adjacent engaging protrusions 7 out of the plurality of engaging protrusions 7 is larger than the sum of a diameter D of the columnar-shaped engaging pin 8 extending in the axial direction when viewed in the axial direction (the maximum dimension in the circumferential direction) and a width W of the engaging protrusion 7 in the circumferential direction. In an example as shown in FIG. 2, the interval Ls between mutually adjacent engaging protrusions 7 is an interval between tip end portions in the protruding directions of the mutually adjacent engaging protrusions 7.

By determining the interval Ls between mutually adjacent engaging protrusions 7 in the manner as described above, it is possible to reduce the moment of inertia of the rotation-restricting-mechanism-rotating-body, as well as to increase the interval between the engaging protrusions 7 mutually adjacent in the circumferential direction. Thus, an impact force caused when the rotation-restricting-mechanism-rotating-body engages with the fixed restricting member is further reduced, and a possibility of offset collision of the engaging pin 8 with the engaging protrusion 7 can be further reduced.

By determining the interval Ls between mutually adjacent engaging protrusions 7 in the manner as described above, it is also possible to secure the strength of the engaging protrusions 7. Therefore, the configuration described above allows for both the securing of the strength of the engaging protrusions 7 and reduced frequency of the offset collision.

In a case where the plurality of fixed parts 4 are fixed to the rotation shaft 27a of the motor 27, and when an external force is applied to an engaging protrusion 7 connected to a radial-support part 3, the external force is transmitted to the radial-support part 3 and two second-circumferential-connecting parts 6 connected to the radial-support part 3.

In the rotation-restricting-mechanism-rotating-body 2 configured in this manner, the plurality of fixed parts 4 are fixed to the rotation shaft 27a of the motor 27. At that time, the rotation-restricting-mechanism-rotating-body 2 is so fixed that the radial center C coincides with the rotation axis R that is the shaft center of the rotation shaft 27a of the motor 27. Accordingly, the rotation-restricting-mechanism-rotating-body 2 is configured to rotate integrally with the rotation shaft 27a of the motor 27, with the rotation axis R of the rotation shaft 27a of the motor 27 as the rotation center.

As shown in FIG. 1, the engaging pin 8 serves as a member for restricting rotation of the rotation-restricting-mechanism-rotating-body 2. The engaging pin 8 is supported by a portion not rotating in conjunction with the motor 27 and the rotation-restricting-mechanism-rotating-body 2, such as a housing of the motor 27. The engaging pin 8 is made of stainless steel having rust-proof property, for example. The engaging pin 8 has a contact part 8a making contact with the engaging protrusions 7 of the rotation-restricting-mechanism-rotating-body 2. The engaging pin 8 is configured to be movable in an axial direction of the engaging pin 8. An axis of the engaging pin 8 is parallel to the rotation axis R of the rotation-restricting-mechanism-rotating-body 2. That is, the engaging pin 8 is configured to engage with the engaging protrusion 7 of the rotation-restricting-mechanism-rotating-body 2 by moving in the rotation axis direction of the rotation-restricting-mechanism-rotating-body 2.

With the engaging pin 8 thus moving in the rotation axial direction of the rotation-restricting-mechanism-rotating-body 2, a size of the rotation-restricting-mechanism-rotating-body 2 in the radial direction can be reduced, compared with a case where the engaging pin moves in the radial direction of the rotation-restricting-mechanism-rotating-body 2. Accordingly, it is possible to reduce the moment of inertia of the rotation-restricting-mechanism-rotating-body 2 and to thereby reduce an impact force caused when the rotation-restricting-mechanism-rotating-body 2 engages with the engaging pin 8.

With the engaging pin 8 moving in the rotation axis direction of the rotation-restricting-mechanism-rotating-body 2 as described above, it is also possible to reduce a thickness of the rotation-restricting-mechanism-rotating-body 2 that is engaged by the engaging pin, compared with the case where the engaging pin moves in the radial direction of the rotation-restricting-mechanism-rotating-body 2. This can reduce a size of the rotation restricting mechanism 1 in the rotation axis direction of the rotation-restricting-mechanism-rotating-body 2.

The engaging pin 8 is changed from either one of a restriction position (indicated by an alternate long and two short dashes line) or an open position (indicated by a solid line) to the other by the solenoid 10, where the restriction position is a position at which the contact part 8a makes contact with the engaging protrusion 7 of the rotation-restricting-mechanism-rotating-body 2, while the open position is a position at which the contact part 8a is free of contact with the engaging protrusion 7. A force is applied to the engaging pin 8 by a spring 9 to be held at the restriction position.

The solenoid 10 generates a driving force for moving the engaging pin 8. The solenoid 10 is supported by the portion not rotating in conjunction with the rotation-restricting-mechanism-rotating-body 2, such as the housing of the motor 27. The solenoid 10 is configured to move the engaging pin 8 held at the restriction position to the open position when turned on.

The rotation restricting mechanism 1 having such a configuration is configured to change the position of the engaging pin 8 from the open position to the restriction position by the solenoid 10, to thereby restrict a rotation angle range that is an angle range within which the rotation-restricting-mechanism-rotating-body 2 is rotatable. The engaging pin 8 is changed to the restriction position, so that the contact part 8a of the engaging pin 8 is located in one of the first to sixth sections S1 to S6 in the rotation-restricting-mechanism-rotating-body 2 (see FIG. 2).

The rotation restricting mechanism 1 restricts, by the engaging pin 8 located in a certain section, the rotation angle range of the rotation-restricting-mechanism-rotating-body 2 from a rotation angle at which one of the engaging protrusions 7 separating the certain section makes contact with the contact part 8a of the engaging pin 8 to a rotation angle at which the other engaging protrusion 7 separating the section makes contact with the contact part 8a of the engaging pin 8.

That is, in a state where the engaging pin 8 is located in a certain section, the rotation restricting mechanism 1 allows the rotation-restricting-mechanism-rotating-body 2 to move with respect to the engaging pin 8 in the circumferential direction between the mutually adjacent engaging protrusions 7 that separate the section. In other words, in a state where the engaging pin 8 is so located to overlap an engaging protrusion 7 when the rotation-restricting-mechanism-rotating-body 2 is viewed in a direction orthogonal to the axial direction, an interval between engaging protrusions 7 mutually adjacent in the circumferential direction in the rotation-restricting-mechanism-rotating-body 2 has a distance that enables relative movement of the engaging pin 8 in the circumferential direction between the mutually adjacent engaging protrusions 7.

Figure 4A:
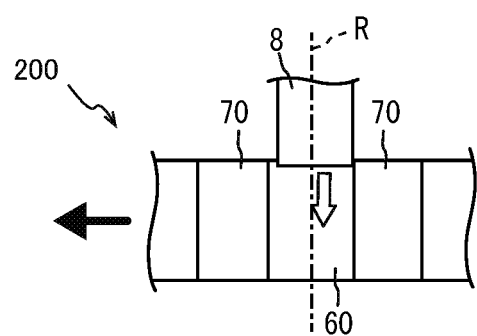
FIG. 4A is a schematic view showing a situation where the engaging pin enters between mutually adjacent engaging protrusions when an interval between the engaging protrusions mutually adjacent in a circumferential direction is small.
Figure 4B:
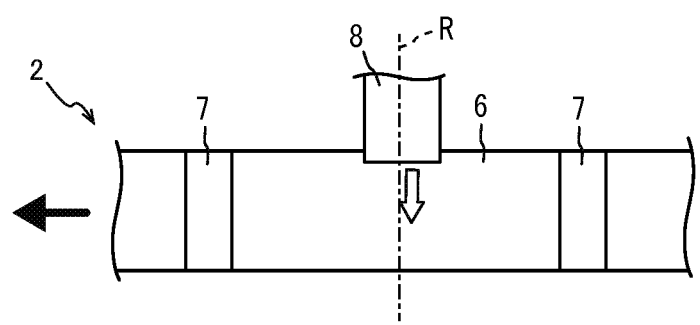
FIG. 4B is a schematic view showing a situation where the engaging pin enters between mutually adjacent engaging protrusions when an interval between the engaging protrusions mutually adjacent in the circumferential direction is large.

Accordingly, in a state where the rotation-restricting-mechanism-rotating-body 2 is rotating, and when the engaging pin 8 engages with an engaging protrusion 7, a possibility of offset collision of the engaging pin 8 with the engaging protrusion 7 can be reduced, compared with a case where the distance between engaging protrusions mutually adjacent in the circumferential direction is small. That is, as shown in FIGS. 4A and 4B, for example, in the configuration where the mutually adjacent engaging protrusions 7 have an interval that enables relative movement of the engaging pin 8 in the circumferential direction therebetween as described above (see FIG. 4B), it is less likely to cause offset collision between the engaging pin 8 and the engaging protrusion 7, as compared with the configuration where the interval between the engaging protrusions 70 only has a margin enough for engagement with the engaging pin 8 (see FIG. 4A). This is conducive to enhanced life of the engaging pin 8 and the engaging protrusions 7. In FIGS. 4A and 4B, the rotation-restricting-mechanism rotating bodies 200, 2 are viewed in a direction orthogonal to the rotation axis R. In FIGS. 4A and 4B, the solid arrows indicate the direction of rotation of the rotation-restricting-mechanism rotating bodies 200, 2, while the open arrows indicate the moving direction of the engaging pin 8.

When the rotation restricting mechanism 1 is used for restricting rotation of the rotation shaft of the motor in an actuator described in a second embodiment that will be described later, an absolute encoder included in the actuator can detect a rotation angle within a mechanical angle of 360 degrees when the motor is stopped. That is, when the motor is stopped, the rotation-restricting-mechanism-rotating-body 2 rotating integrally with the absolute encoder is rotated to enable relative movement of the engaging pin 8 in the circumferential direction between mutually adjacent engaging protrusions 7, so that the absolute encoder detects a Z-phase signal and thereby detects an origin of the mechanical angle. The absolute encoder may be replaced with other encoders.

The interval between the mutually adjacent engaging protrusions 7 is preferably smaller than the center angle θ of 60 degrees made by the mutually adjacent radial-support parts 3 in the rotation-restricting-mechanism-rotating-body 2 of this embodiment.

(State of Rotation-Restricting-Mechanism-Rotating-Body 2 in Restricting Rotation of Motor 27)

The state of the rotation-restricting-mechanism-rotating-body 2 when the position of the engaging pin 8 is changed to the restriction position, will now be described with reference to FIG. 3.

In a case where the engaging pin 8 is changed to the restriction position in the first section S1 of the rotation-restricting-mechanism-rotating-body 2, for example, the rotation restricting mechanism 1 restricts the rotation angle range of the rotation-restricting-mechanism-rotating-body 2 from an angle at which the first engaging protrusion 7a makes contact with the contact part 8a of the engaging pin 8 to an angle at which the second engaging protrusion 7b makes contact with the contact part 8a of the engaging pin 8.

(Transmission of External Force)

In a case where the rotation shaft 27a of the motor 27 is rotating in the one circumferential direction (see the solid arrow), the first engaging protrusion 7a of the rotation-restricting-mechanism-rotating-body 2 makes contact with the engaging pin 8. An external force in the other circumferential direction (i.e., in the other direction along the circumference) as a reactive force (hereinafter referred to simply as "external force of the other direction") is applied from the engaging pin 8 to the first engaging protrusion 7a that has made contact with the engaging pin 8 (see the black-filled arrow A0). The external force of the other direction, applied to the first engaging protrusion 7a, is transmitted to the first radial-support part 3a, the first second-circumferential-connecting part 6a so connected to the outer end portion of the first radial-support part 3a to extend in the one circumferential direction, and the sixth second-circumferential-connecting part 6f so connected to the outer end portion of the first radial-support part 3a to extend in the other circumferential direction (see the hatched arrow A1, the hatched arrow A2 and the hatched arrow A3).

(Stress Occurring in First Radial-Support Part 3a)

In the first radial-support part 3a, elastic deformation that causes the first radial-support part 3a to bend in the other circumferential direction occurs by the external force of the other direction applied to the first engaging protrusion 7a. At that time, a stress occurs in a connecting portion between the first radial-support part 3a and the first first-circumferential-connecting part 5a and in a connecting portion between the first radial-support part 3a and the sixth first-circumferential-connecting part 5f (see the region S1), by the elastic deformation. Stresses also occur in a connecting portion between the first radial-support part 3a and the first second-circumferential-connecting part 6a and in a connecting portion between the first radial-support part 3a and the sixth second-circumferential-connecting part 6f (see the regions S2), by the elastic deformation.

(Stress Occurring in Second Radial-Support Part 3b)

In the first second-circumferential-connecting part 6a so connected to the first radial-support part 3a to extend in the one circumferential direction, elastic deformation that causes the first second-circumferential-connecting part 6a to be elongated in the other circumferential direction occurs by the external force of the other direction. Furthermore, the external force of the other direction by the elastic deformation of the first second-circumferential-connecting part 6a is applied to the outer end portion of the second radial-support part 3b connected to the first second-circumferential-connecting part 6a (see the hatched arrow A2).

In the second radial-support part 3b, elastic deformation that causes the second radial-support part 3b to bend in the other circumferential direction from the outer end portion thereof, occurs by the external force of the other direction transmitted from the first second-circumferential-connecting part 6a. At that time, a stress occurs in a connecting portion between the second radial-support part 3b and the first first-circumferential-connecting part 5a and in a connecting portion between the second radial-support part 3b and the second first-circumferential-connecting part 5b (see the region S3) by the elastic deformation. Stresses also occur in a connecting portion between the second radial-support part 3b and the first second-circumferential-connecting part 6a and in a connecting portion between the second radial-support part 3b and the second second-circumferential-connecting part 6b (see the regions S4) by the elastic deformation.

(Stress Occurring in Sixth Radial-Support Part 3f)

In the sixth second-circumferential-connecting part 6f so connected to the first radial-support part 3a to extend in the other circumferential direction, elastic deformation that causes the sixth second-circumferential-connecting part 6f to be compressed in the other circumferential direction occurs by the external force of the other direction from the first engaging protrusion 7a. Furthermore, the external force of the other direction by the elastic deformation of the sixth second-circumferential-connecting part 6f is applied to the outer end portion of the sixth radial-support part 3f connected to the sixth second-circumferential-connecting part 6*f* (see the hatched arrow A3).

In the sixth radial-support part 3*f*, elastic deformation that causes the sixth radial-support part 3*f* to bend in the other circumferential direction from the outer end portion thereof, occurs by the external force of the other direction transmitted from the sixth second-circumferential-connecting part 6*f*. At that time, a stress occurs in a connecting portion between the sixth radial-support part 3*f* and the sixth first-circumferential-connecting part 5*f* and in a connecting portion between the sixth radial-support part 3*f* and the fifth first-circumferential-connecting part 5*e* (see the region S5), by the elastic deformation. Stresses also occur in a connecting portion between the sixth radial-support part 3*f* and the sixth second-circumferential-connecting part 6*f* and in a connecting portion between the sixth radial-support part 3*f* and the fifth second-circumferential-connecting part 6*e* (see the regions S6) by the elastic deformation.

The external force of the other direction applied to the first engaging protrusion 7*a* from the engaging pin 8 is distributed and transmitted mainly to the first radial-support part 3*a*, the first second-circumferential-connecting part 6*a*, the second radial-support part 3*b*, the sixth second-circumferential-connecting part 6*f* and the sixth radial-support part 3*f*. The first radial-support part 3*a*, the first second-circumferential-connecting part 6*a*, the second radial-support part 3*b*, the sixth second-circumferential-connecting part 6*f* and the sixth radial-support part 3*f* are each elastically deformed based on their own stiffness, fixed position, connecting position with another member, magnitude of the external force of the other direction, position to which the external force of the other direction is applied, or the like. As a result, a stress occurring in the rotation-restricting-mechanism-rotating-body 2 by the engagement of the engaging pin 8 with the first engaging protrusion 7*a*, is distributed to the first radial-support part 3*a* (see the region S1, the regions S2), the second radial-support part 3*b* (see the region S3, the regions S4) and the sixth radial-support part 3*f* (see the region S5, the regions S6).

The plurality of radial-support parts 3 disposed in a radial pattern are connected at their inner end portions to the plurality of first-circumferential-connecting parts 5, and at their outer end portions to the plurality of second-circumferential-connecting parts 6. Accordingly, in the rotation-restricting-mechanism-rotating-body 2, the plurality of radial-support parts 3 have increased stiffness due to the plurality of first-circumferential-connecting parts 5 and the plurality of second-circumferential-connecting parts 6.

The rotation-restricting-mechanism-rotating-body 2 has openings made by the plurality of radial-support parts 3, the plurality of first-circumferential-connecting parts 5 and the plurality of second-circumferential-connecting parts 6. Thus, when an external force is applied in the rotation-restricting-mechanism-rotating-body 2, elastic deformation occurs in the first-circumferential-connecting parts 5, the second-circumferential-connecting parts 6 and the radial-support parts 3, respectively, in accordance with their own stiffness. In the rotation-restricting-mechanism-rotating-body 2, the plurality of second-circumferential-connecting parts 6 connecting the outer end portions of mutually adjacent radial-support parts 3 deform with respect to the plurality of first-circumferential-connecting parts 5 connecting the inner end portions of the mutually adjacent radial-support parts 3. In this manner, the rotation-restricting-mechanism-rotating-body 2 absorbs an impact force caused when an external force is applied to an engaging protrusion 7, by the elastic deformation of the first-circumferential-connecting parts 5, the second-circumferential-connecting parts 6 and the radial-support parts 3.

The rotation-restricting-mechanism-rotating-body 2 has the openings made by the plurality of radial-support parts 3, the plurality of first-circumferential-connecting parts 5 and the plurality of second-circumferential-connecting parts 6. Thus, a difference between the stiffness of the plurality of engaging protrusions 7, and the stiffness of the plurality of radial-support parts 3 and the plurality of second-circumferential-connecting parts 6 that are connected to the engaging protrusions 7, is smaller than a difference between the stiffness of the plurality of engaging protrusions and the stiffness of a disk-shaped portion with no openings of a rotation-restricting-mechanism-rotating-body when the rotation-restricting-mechanism-rotating-body is formed in a disk shape with no openings.

The rotation-restricting-mechanism-rotating-body 2 has the openings as described above, and thereby absorbs an impact force caused when an external force is applied to an engaging protrusion 7, by the elastic deformation of the first-circumferential-connecting parts 5, the second-circumferential-connecting parts 6 and the radial-support parts 3. Thus, the impact force caused to the rotation-restricting-mechanism-rotating-body 2 by the contact with the engaging pin 8 decreases as an amount of elastic deformation increases. Therefore, when the external force is applied to the engaging protrusion 7 of the rotation-restricting-mechanism-rotating-body 2, stress concentration occurring in the engaging protrusion 7 is alleviated. Accordingly, in the rotation-restricting-mechanism-rotating-body 2, plastic deformation due to the stress exceeding its allowable limit is less likely to occur, compared with the case where a rotation-restricting-mechanism-rotating-body is formed in a disk shape with no openings.

The weight of the rotation-restricting-mechanism-rotating-body 2 is less than the weight of a rotation-restricting-mechanism-rotating-body formed in a disk shape with no openings. That is, the moment of inertia of the rotation-restricting-mechanism-rotating-body 2 having the openings is smaller than the moment of inertia of a rotation-restricting-mechanism-rotating-body having a disk shape with no openings. Accordingly, the rotation-restricting-mechanism-rotating-body 2 can suppress an impact force caused when an external force is applied to an engaging protrusion 7, compared with the case where a rotation-restricting-mechanism-rotating-body is formed in a disk shape with no openings.

The rotation restricting mechanism 1 including the rotation-restricting-mechanism-rotating-body 2 configured in the above-described manner, can be used in portions that a stronger force acts on, or enables the engagement with the engaging pin 8 in a state where rotation of the motor 27 connected to the rotation-restricting-mechanism-rotating-body 2 is not stopped. Accordingly, the rotation-restricting-mechanism-rotating-body 2 can expand the use environment of the rotation restricting mechanism 1 that restricts the rotation by the engagement of any one of the plurality of engaging protrusions 7 with the engaging pin 8.

The rotation-restricting-mechanism control device 100 includes an engaging-protrusion-position detector 110 and an engaging-pin-movement controller 120.

The engaging-protrusion-position detector 110 detects positions of the engaging protrusions 7 of the rotation-restricting-mechanism-rotating-body 2 based on an output from a position detecting sensor 111 when the rotation-restricting-mechanism-rotating-body 2 is rotating about the rotation axis R. The engaging-protrusion-position detector may be implemented by the functions of an encoder.

The engaging-pin-movement controller 120 moves the engaging pin 8 in the axial direction. When the position of the engaging pin 7 is detected by the engaging-protrusion-position detector 110, the engaging-pin-movement controller 120 moves the engaging pin 8 in the axial direction. The engaging-pin-movement controller 120 moves the engaging pin 8 in the axial direction with the force of the spring 9 by, for example, cutting off an electric current to the solenoid 10. This causes the engaging pin 8 to move to the restriction position for making contact with the engaging protrusion 7.

When the engaging-protrusion-position detector 110 detects, for example, that an engaging protrusion 7 of the rotation-restricting-mechanism-rotating-body 2 is located at the same circumferential position as the engaging pin 8, the engaging-pin-movement controller 120 cuts off the electric current to the solenoid 10. The engaging-pin-movement controller 120, the solenoid 10 and the spring 9 constitute an engaging-pin-moving device 130. The engaging-pin-moving device may be constituted of elements other than the solenoid and the spring as long as the device can move the engaging pin 8 in the axial direction. The engaging-pin-movement controller may move the engaging pin 8 in the axial direction at another timing as long as that timing permits the engaging pin 8 to engage with an engaging protrusion 7 of the rotation-restricting-mechanism-rotating-body 2.

As described above, the engaging-pin-moving device 130 moves the engaging pin 8 in the axial direction with respect to the rotation-restricting-mechanism-rotating-body 2, in accordance with the positions of the engaging protrusions 7 detected by the engaging-protrusion-position detector 110.

Second Embodiment

<Multi-Joint-Robot-Arm Device 11>

Figure 5:
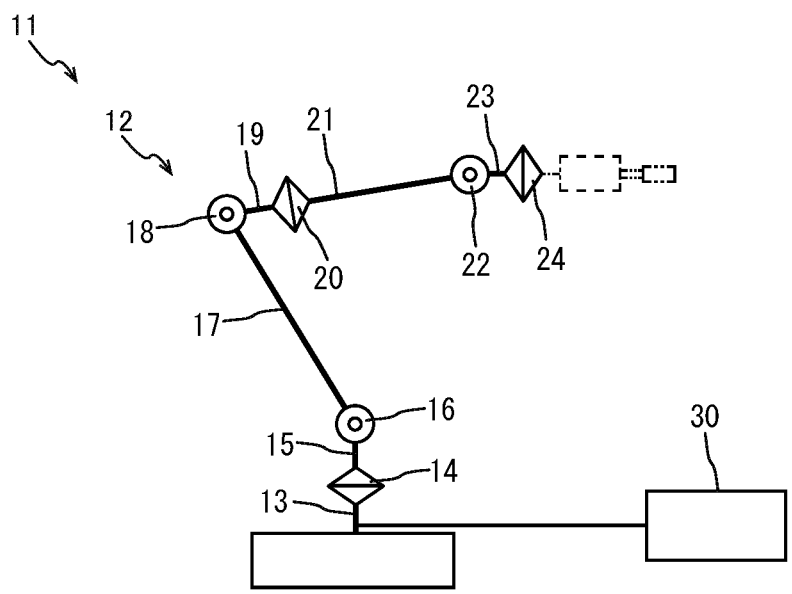
FIG. 5 is a schematic view of a multi-joint-robot-arm device according to a second embodiment of the present teaching.
Figure 6:
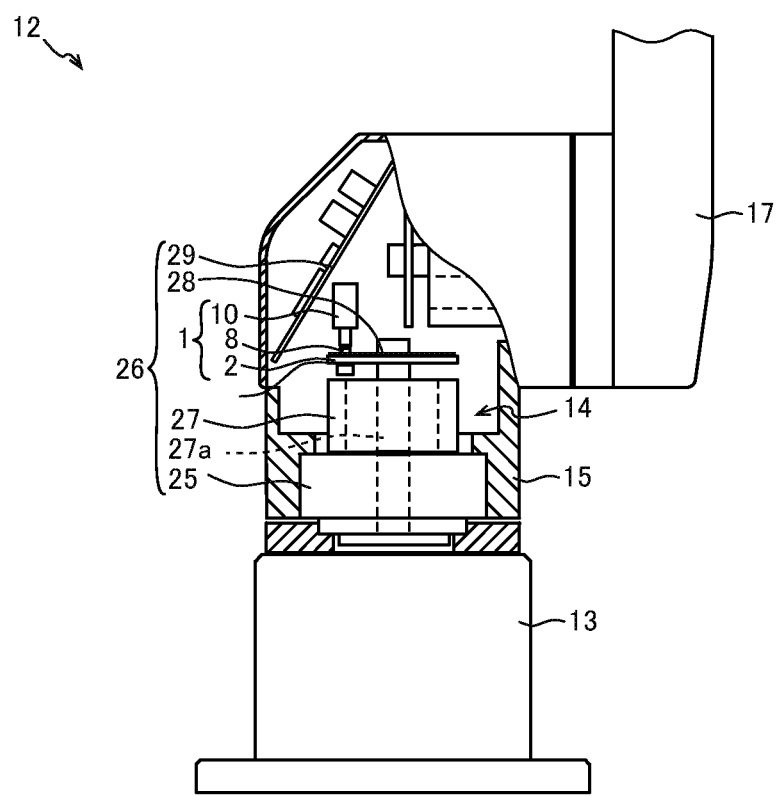
FIG. 6 is a schematic view of a S-axis rotary joint related to a multi joint robot arm according to the second embodiment of the present teaching.

With reference to FIG. 5 to FIG. 6, an entire configuration of a multi-joint-robot-arm device 11 according to a second embodiment of the present teaching will be described. Note that, in the following embodiment, specific description of similar points to those in the embodiment already described will be omitted and only a portion which differs from the already described embodiment will be described in detail.

The multi-joint-robot-arm device 11 includes the rotation restricting mechanism 1 having the rotation-restricting-mechanism-rotating-body 2 according to the first embodiment of the present teaching. FIG. 5 is a schematic view of the multi-joint-robot-arm device 11 according to the second embodiment of the present teaching. FIG. 6 is a schematic view of an S-axis rotary joint 14 of a multi-joint-robot-arm 12 according to the second embodiment of the present teaching.

(Multi-Joint Robot Arm 12)

As shown in FIG. 5, the multi-joint-robot-arm device 11 includes the multi joint robot arm 12 and a multi-joint-robot-arm control device 30. In this embodiment, the multi-joint robot arm 12 is a robot arm of a serial link mechanism in which links are connected in series from a base end to a tip end via rotary joints of one degree of freedom. The multi-joint robot arm 12 is, for example, a six-axis vertical multi joint robot arm. The multi joint robot arm 12 is provided, for example, on a base of a manufacturing device or a remote operation vehicle that can be remotely operated.

In the multi joint robot arm 12, an S-axis rotary joint 14, an L-axis rotary joint 16, a U-axis rotary joint 18, an R-axis rotary joint 20, a B-axis rotary joint 22, and a T-axis rotary joint 24 are connected in series in this order from a base end portion via cases and links. Each axis is configured to be rotatable by a speed reducer 25 and an actuator 26. Each of the S-axis rotary joint 14, the L-axis rotary joint 16, the U-axis rotary joint 18, the R-axis rotary joint 20, the B-axis rotary joint 22, and the T-axis rotary joint 24 includes the speed reducer 25 and the actuator 26 (see FIG. 6).

The multi joint robot arm 12 is controlled by the multi-joint-robot-arm control device 30. The multi joint robot arm 12 acquires a control signal output from the multi-joint-robot-arm control device 30 by a driving unit 29 included in the actuator 26 of each axis. The multi joint robot arm 12 transmits, to the multi-joint-robot-arm control device 30, information related to an output of the actuator 26 and information output from an absolute encoder 28, of each axis.

As illustrated in FIG. 6, the S-axis rotary joint 14 is a rotary joint that turns the entire multi joint robot arm 12. The S-axis rotary joint 14 is provided in a case 15 for S and L axes of the multi joint robot arm 12. A base member 13 is fixed to an output shaft of the S-axis rotary joint 14. The base member 13 is fixed to an installation surface of the multi-joint robot arm 12. The S-axis rotary joint 14 is disposed such that an axis line of the S-axis rotary joint 14 extends in a direction perpendicular to the installation surface of the multi joint robot arm 12.

As illustrated in FIG. 5, the L-axis rotary joint 16 is a rotary joint that causes a lower arm link 17 to swing. The L-axis rotary joint 16 is provided in the case 15 for S and L axes. The L-axis rotary joint 16 is disposed such that an axis line of the L-axis rotary joint 16 extends in a direction perpendicular to the axis line of the S-axis rotary joint 14. One end portion of the lower arm link 17 is fixed to an output shaft of the L-axis rotary joint 16.

The U-axis rotary joint 18 is a rotary joint that causes an upper arm link 21 to swing. The U-axis rotary joint 18 is provided in a case 19 for U and R axes of the multi joint robot arm 12. An output shaft of the U-axis rotary joint 18 is fixed to the other end portion of the lower arm link 17. The U-axis rotary joint 18 is disposed such that an axis line of the U-axis rotary joint 18 extends in a direction parallel to the axis line of the L-axis rotary joint 16.

The R-axis rotary joint 20 is a rotary joint that causes the upper arm link 21 to rotate. The R-axis rotary joint 20 is provided in the case 19 for U and R axes. The R-axis rotary joint 20 is disposed such that an axis line of the R-axis rotary joint 20 extends in a direction perpendicular to the axis line of the U-axis rotary joint 18. One end portion of the upper arm link 21 is fixed to an output shaft of the R-axis rotary joint 20.

The B-axis rotary joint 22 is a rotary joint that causes the T-axis rotary joint 24 to swing. The B-axis rotary joint 22 is provided in a case 23 for B and T axes of the multi joint robot arm 12. An output shaft of the B-axis rotary joint 22 is fixed to the other end portion of the upper arm link 21. The B-axis rotary joint 22 is disposed such that an axis line of the B-axis rotary joint 22 extends in a direction perpendicular to the axis line of the R-axis rotary joint 20.

The T-axis rotary joint 24 is a rotary joint that causes an unillustrated end effector to rotate. The T-axis rotary joint 24 is provided in the case 23 for B and T axes. The T-axis rotary joint 24 is disposed such that an axis line of the T-axis rotary joint 24 extends in a direction perpendicular to the axis line of the B-axis rotary joint 22. An output shaft of the T-axis rotary joint 24 includes an end effector attachment portion.

The multi joint robot arm 12 configured in the above-described manner has three translational degrees of freedom in an X axis, a Y axis, and a Z axis and three rotational degrees of freedom around the X axis, the Y axis, and the Z axis, that is, six degrees of freedom in total, by the speed reducer 25 and the actuator 26 of each axis. Accordingly, the multi joint robot arm 12 can move the output shaft of the T-axis rotary joint 24 to an arbitrary position and also can be made to have an arbitrary posture in a movable space of the multi-joint robot arm 12.

(Actuator)

As shown in FIG. 5 and FIG. 6, the speed reducer 25 and the actuator 26 of each of the S axis, the L axis, the U axis, the R axis, the B axis, and the T axis is a driving unit that causes the output shaft to rotate in accordance with a control signal from the multi-joint-robot-arm control device 30. The speed reducer 25 and the actuator 26 are disposed in the case 15, the case 19, and the case 23 (see FIG. 5) of the multi joint robot arm 12. The speed reducers 25 and the actuators 26 of the axes, respectively, have the same configuration, and therefore, the S-axis rotary joint 14 will be described below.

As shown in FIG. 6, the speed reducer 25 of the S-axis rotary joint 14 causes the output shaft to rotate in a state where rotation speed of the output shaft is decelerated with respect to rotation speed of an input shaft and generates, as an output torque of the output shaft, an output torque inversely proportional to the deceleration. The speed reducer 25 is provided in the case 15 of the multi-joint robot arm 12. A housing of the speed reducer 25 is fixed to inside of the case 15 of the multi joint robot arm 12. An output shaft of the speed reducer 25 is fixed to the base member 13.

The actuator 26 of the S-axis rotary joint 14 includes the speed reducer 25, the motor 27, the rotation restricting mechanism 1, the absolute encoder 28, and the driving unit 29 that is a computer for controlling the motor 27. The speed reducer 25, the motor 27, the rotation restricting mechanism 1, the absolute encoder 28 and the driving unit 29 are disposed in the case 15 of the multi-joint robot arm 12.

The motor 27 included in the actuator 26 is a power generation source. In this embodiment, the motor 27 is a so-called inner rotor motor 27 in which a rotor is disposed so as to be rotatable in a cylindrical stator. The rotation shaft 27a extending along the shaft center is fixed to the rotor in a state where the rotation shaft 27a passes therethrough in the axial direction. The motor 27 is fixed to one end portion to which power is input in a case of the speed reducer 25. One end portion of the rotation shaft 27a is connected to an input shaft of the speed reducer 25 as an output shaft of the motor 27.

The rotation restricting mechanism 1 included in the actuator 26 restricts rotation of the rotation shaft 27a in the motor 27. In this embodiment, the rotation restricting mechanism 1 is provided in the other end portion of the rotation shaft 27a. The rotation restricting mechanism 1 limits rotation of the rotation shaft 27a of the motor 27 by mechanical engagement. The rotation restricting mechanism 1 may be provided in the one end portion of the rotation shaft 27a.

(Rotation Restricting Mechanism 1)

The rotation restricting mechanism 1 includes the rotation-restricting-mechanism-rotating-body 2 (see FIG. 2), the engaging pin 8 and the solenoid 10. The rotation restricting mechanism 1 restricts rotation of the rotation shaft 27a by causing the engaging pin 8 to engage with the rotation-restricting-mechanism-rotating-body 2 that rotates integrally with the rotation shaft 27a of the motor 27 (FIG. 1).

The absolute encoder 28 included in the actuator 26 detects a rotation angle of the rotation shaft 27a in the motor 27 within a mechanical angle of 360 degrees. The absolute encoder 28 transmits an AB-phase signal used for detecting a rotation angle within a mechanical angle of 360 degrees and a Z-phase signal used for detecting an origin of the mechanical angle to the driving unit 29 and the multi-joint-robot-arm control device 30 (see FIG. 2). The absolute encoder 28 is provided in the other end portion of the rotation shaft 27a in the motor 27. That is, the rotation restricting mechanism 1 and the absolute encoder 28 rotate integrally with the rotation shaft 27a of the motor 27.

The driving unit 29 provided in the actuator 26 controls a drive electric current supplied to the motor 27. The driving unit 29 is, for example, a computer. The driving unit 29 is provided in the case 15 of the multi joint robot arm 12. The driving unit 29 supplies the motor 27 with an electric current in accordance with the control signal from the multi-joint-robot-arm control device 30. The driving unit 29 acquires the AB-phase signal and the Z-phase signal of the absolute encoder 28 as feedback pulses. The driving unit 29 controls the motor 27 by feedback control in which an electric current in accordance with a difference of a feedback pulse with respect to a command pulse is supplied to the motor 27. The driving unit 29 also controls the solenoid 10 of the rotation restricting mechanism 1.

In the S-axis rotary joint 14 configured in the above-described manner, the speed reducer 25, the motor 27, the rotation restricting mechanism 1 and the absolute encoder 28 are integrally configured. The multi joint robot arm 12 is configured as an electromechanical integrated configuration in which the speed reducer 25, the actuator 26, and the driving unit 29 are disposed in the case 15 of the multi joint robot arm 12. In the S-axis rotary joint 14, the output shaft of the speed reducer 25 rotates due to rotation of the motor 27, and thus, the case 15 and the actuator 26, of the multi joint robot arm 12, are caused to integrally rotate.

As shown in FIG. 5, the multi joint robot-arm control device 30 is a device that controls the multi joint robot arm 12. The multi-joint-robot-arm control device 30 may be substantially configured such that a CPU, a ROM, a RAM, a HDD, and the like are connected via a bus and, alternatively, may be configured of a one-chip LSI or the like. Various types of programs or data are stored in the multi-joint-robot-arm control device 30 in order to control an operation of the multi joint robot arm 12.

The multi-joint-robot-arm control device 30 is connected to each of the driving units 29 included in the S-axis rotary joint 14, the L-axis rotary joint 16, the U-axis rotary joint 18, the R-axis rotary joint 20, the B-axis rotary joint 22, and the T-axis rotary joint 24. The multi-joint-robot-arm control device 30 can transmit a control signal to the driving unit 29 of each axis. Moreover, the multi-joint-robot-arm control device 30 can acquire rotation position information of the motor 27 from the actuator 26 and the driving unit 29 of each axis.

In the rotation-restricting-mechanism-rotating-body 2 with the openings as described above, plastic deformation of the engaging protrusions 7 is less likely to occur, compared with a rotation-restricting-mechanism-rotating-body formed in a disk shape with no openings. Thus, the rotation-restricting-mechanism-rotating-body 2 can be used to restrict rotation of the actuator 26 for the S-axis rotary joint 14 that the strongest force acts on, out of the rotary joints of respective axes. The multi-joint-robot-arm device 11 uses the rotation-restricting-mechanism-rotating-body 2, and thereby can restrict rotation of the motor 27 in a state where the rotation of the motor 27 is not stopped, without loss of power supply, or the like. Accordingly, the rotation-restricting-mechanism-rotating-body 2 can expand the use environment of the rotation restricting mechanism 1 that restricts the rotation by the engagement of any one of the plurality of engaging protrusions 7 with the engaging pin 8.

As operation of the rotation restricting mechanism 1, three modes of operation, for example, can be considered. That is, the operation of the rotation restricting mechanism 1 includes a first operation, a second operation and a third operation. The first operation is an operation for causing the engaging pin 8 to engage with an engaging protrusion 7 of the rotation-restricting-mechanism-rotating-body 2 after rotation of the rotation shaft 27a is stopped by a regeneration brake (not shown) included in the motor 27. The second operation is an operation for converting energy of rotating bodies including the rotation-restricting-mechanism-rotating-body 2 into heat by an unillustrated short brake, and thereafter causing the engaging pin 8 to engage with the engaging protrusion 7 of the rotation-restricting-mechanism-rotating-body 2 in a state where the rotation-restricting-mechanism-rotating-body 2 is rotating. The third operation is an operation for causing the engaging pin 8 to engage with the engaging protrusion 7 of the rotation-restricting-mechanism-rotating-body 2 in a state where the rotation-restricting-mechanism-rotating-body 2 is rotating. The rotation restricting mechanism 1, when it is in operation, performs one of the first operation, the second operation or the third operation in accordance with, for example, the functional state of the multi-joint-robot-arm device 11.

Third Embodiment

<Rotation-Restricting-Mechanism-Rotating-Body 2B With Limited Width between First-Circumferential-Connecting Part 5 and Second-Circumferential-Connecting Part 6>

Figure 7:
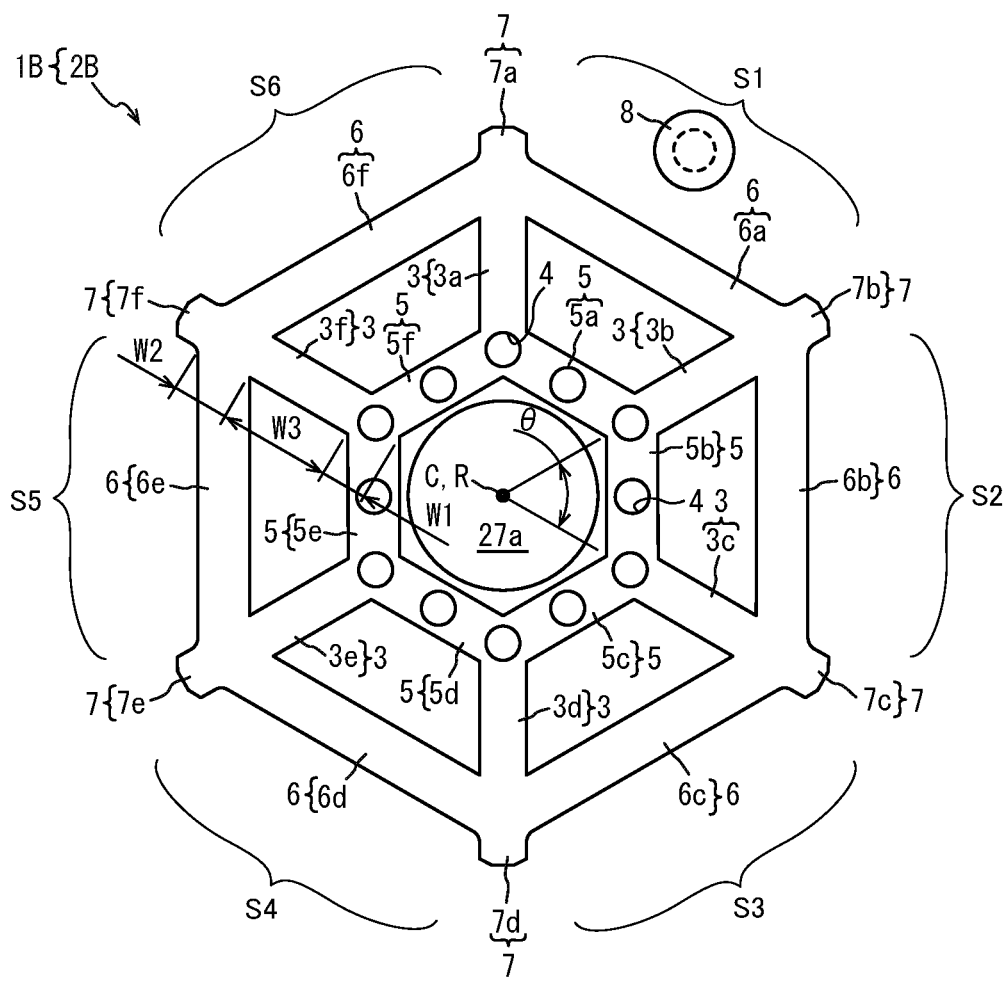
FIG. 7 is a plan view of a rotation-restricting-mechanism-rotating-body according to a third embodiment of the present teaching.

A rotation restricting member 1B according to a third embodiment of the present teaching will now be described with reference to FIG. 7. FIG. 7 is a plan view of a rotation-restricting-mechanism-rotating-body 2B according to the third embodiment of the present teaching.
(Rotation Restricting Mechanism 1B)

As shown in FIG. 7, the rotation restricting mechanism 1B includes the rotation-restricting-mechanism-rotating-body 2B, the engaging pin 8 and the solenoid 10 (see FIG. 1). The rotation restricting mechanism 1B restricts rotation of the rotation shaft 27a by causing the engaging pin 8 to engage with the rotation-restricting-mechanism-rotating-body 2B that rotates integrally with the rotation shaft 27a of the motor 27 (see FIG. 1).

The rotation-restricting-mechanism-rotating-body 2B is a frame-like member rotating integrally with the rotation shaft 27a of the motor 27. The rotation-restricting-mechanism-rotating-body 2B is of a polygonal shape (a hexagon in an example of FIG. 7) when viewed in the axial direction of the rotation shaft 27a. The rotation-restricting-mechanism-rotating-body 2B includes the plurality of beam-shaped radial-support parts 3, the plurality of beam-shaped first-circumferential-connecting parts 5, the plurality of beam-shaped second-circumferential-connecting parts 6, and the plurality of engaging protrusions 7.

The plurality of radial-support parts 3 are disposed in a radial pattern, with the rotation axis R that is the shaft center of the rotation shaft 27a as the radial center C. In addition, the plurality of radial-support parts 3 are so disposed that all of the center angles θ each made by mutually adjacent radial-support parts 3 are equal. The longitudinal directions of the plurality of radial-support parts 3 coincide with the radial direction of the rotation-restricting-mechanism-rotating-body 2B.

Each of the first-circumferential-connecting parts 5 has a width W1 in the lateral direction (in the radial direction of the rotation-restricting-mechanism-rotating-body 2B), and is formed like a beam. Each of the first-circumferential-connecting parts 5 is connected to mutually adjacent radial-support parts 3 over a range of the width W1 in the longitudinal direction of each of the mutually adjacent radial-support parts 3 from its inner end.

Each of the second-circumferential-connecting parts 6 has a width W2 in the lateral direction (in the radial direction of the rotation-restricting-mechanism-rotating-body 2B), and is formed like a beam. Each of the second-circumferential-connecting parts 6 is connected to mutually adjacent radial-support parts 3 over a range of the width W2 in the longitudinal direction of each of the mutually adjacent radial-support parts 3 from its outer end.

The width W1 of each of the first-circumferential-connecting parts 5 and the width W2 of each of the second-circumferential-connecting parts 6 are less than an interval W3 between an outer edge of the first-circumferential-connecting part 5 and an inner edge of the second-circumferential-connecting part 6. That is, the first-circumferential-connecting part 5 is connected to the inner end portion of each of the radial-support parts 3 over the range of the width W1 less than a range of the radial interval W3 to which nothing is connected in the radial-support part 3. The second-circumferential-connecting part 6 is connected to the outer end portion of each of the radial-support parts 3 over the range of the width W2 less than the range of the radial interval W3.

In each of the radial-support parts 3 configured in this manner, the stiffness in the range of the radial interval W3 is less than the stiffness in the range of the width W1 to which the first-circumferential-connecting part 5 is connected and the stiffness in the range of the width W2 to which the second-circumferential-connecting part 6 is connected. Thus, in each of the radial-support parts 3, elastic deformation in the range of the interval W3 is more likely to occur as the range of the interval W3 becomes larger than the width W1 and the width W2. This reduces the stresses in the range of the width W1 and the range of the width W2 of the radial-support part 3 caused by the elastic deformation.
(State of Rotation-Restricting-Mechanism-Rotating-Body 2B in Restricting Rotation of Motor 27)

In a case where the rotation shaft 27a of the motor 27 is rotating in the one circumferential direction (see the solid arrow), and when the position of the engaging pin 8 is changed to the restriction position, an engaging protrusion 7 of the rotation-restricting-mechanism-rotating-body 2B, while rotating in the one circumferential direction, makes contact with the engaging pin 8. An external force of the other direction is applied from the engaging pin 8 to the engaging protrusion 7 that has made contact with the engaging pin 8 (see the black-filled arrow in FIG. 3).

Figure 3:
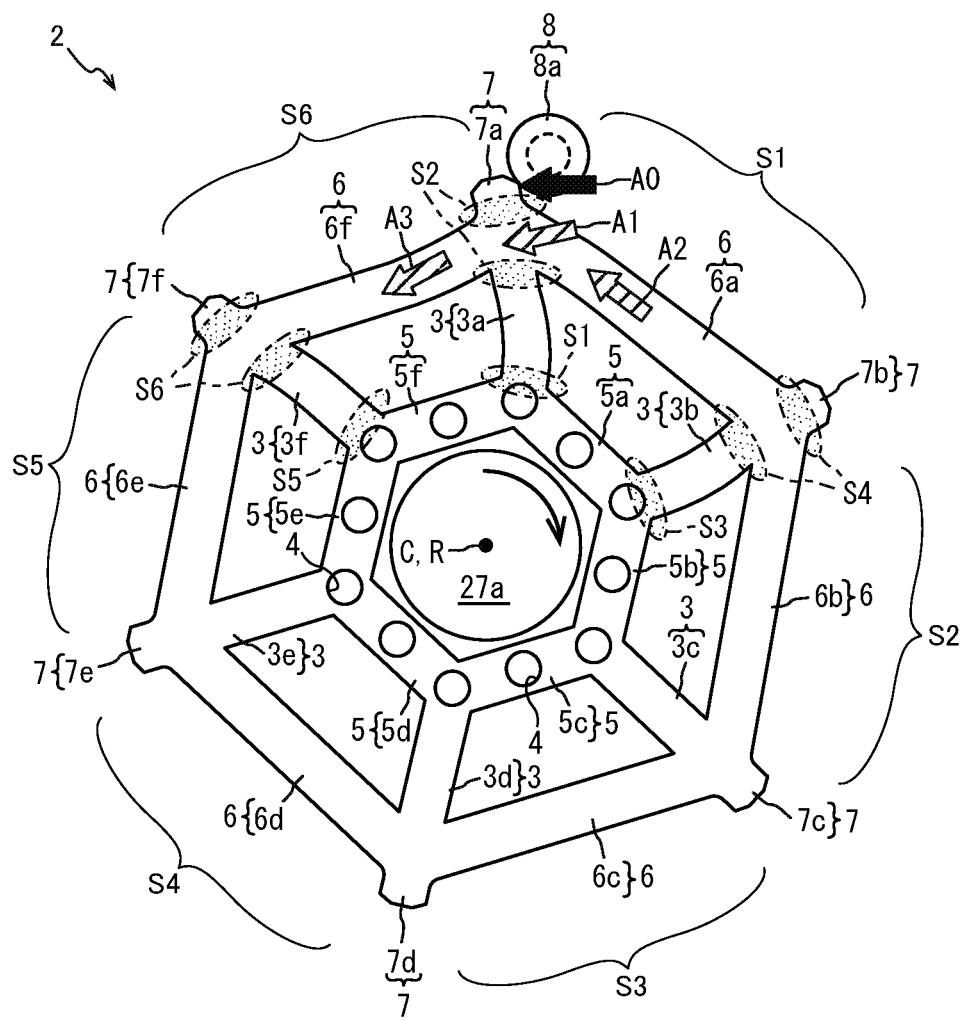
FIG. 3 is a plan view showing an elastic deformation state when an engaging pin makes contact with the rotation-restricting-mechanism-rotating-body according to the first embodiment of the present teaching.

The external force of the other direction, applied to the engaging protrusion 7, is transmitted to the radial-support part 3, the second-circumferential-connecting part 6 so connected to the outer end portion of the radial-support part 3 to extend in the one circumferential direction, and the second-circumferential-connecting part 6 so connected to the outer end portion of the radial-support part 3 to extend in the other circumferential direction (see the hatched arrow A1, the hatched arrow A2 and the hatched arrow A3 in FIG. 3).

In the radial-support part 3, elastic deformation that causes the radial-support part 3 to bend in the other circumferential direction from the outer end portion thereof occurs by the external force of the other direction. In the radial-support part 3, larger elastic deformation occurs in the range of the interval W3 than in the range of the width W1 in the inner end portion thereof and the range of the width W2 in the outer end portion thereof, where the range of the interval W3 has less stiffness than the range of the width W1 and the range of the width W2, and is larger than the range of the width W1 and the range of the width W2.

Stresses occur in the range of the width W1, the range of the width W2 and the interval W3, of the radial-support part 3, by elastic deformation. At that time, the stresses occurring in the range of the width W1 and the range of the width W2 are reduced by the elastic deformation that occurs in the range of the interval W3. That is, the stress occurring in the radial-support part 3 is distributed to the range of the width W1, the range of the width W2 and the range of the interval W3. Stress concentration occurring in the range of the width W1 and the range of the width W2 is alleviated by the elastic deformation that occurs in the range of the interval W3. This reduces stress values in the range of the width W1 and the range of the width W2. Thus, in the rotation-restricting-mechanism-rotating-body 2B, plastic deformation is less likely to occur. Therefore, the rotation-restricting-mechanism-rotating-body 2B can expand the use environment of the rotation restricting mechanism 1B that restricts rotation by the engagement of the plurality of engaging protrusions 7.

Fourth Embodiment

<Rotation-Restricting-Mechanism-Rotating-Body 2C with Engaging Protrusion 31 Extending in Axial Direction>

Figure 8:
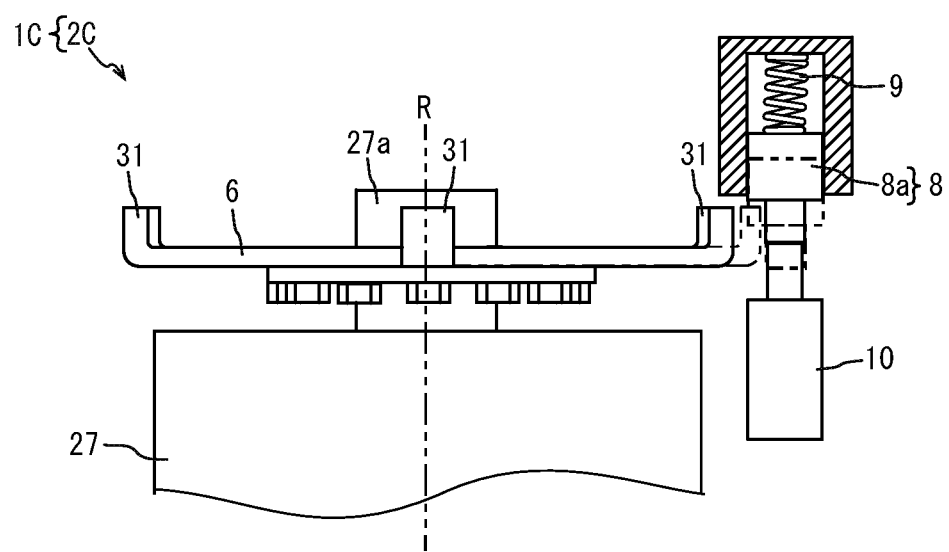
FIG. 8 is a side view of a rotation restricting mechanism according to a fourth embodiment of the present teaching.
Figure 9:
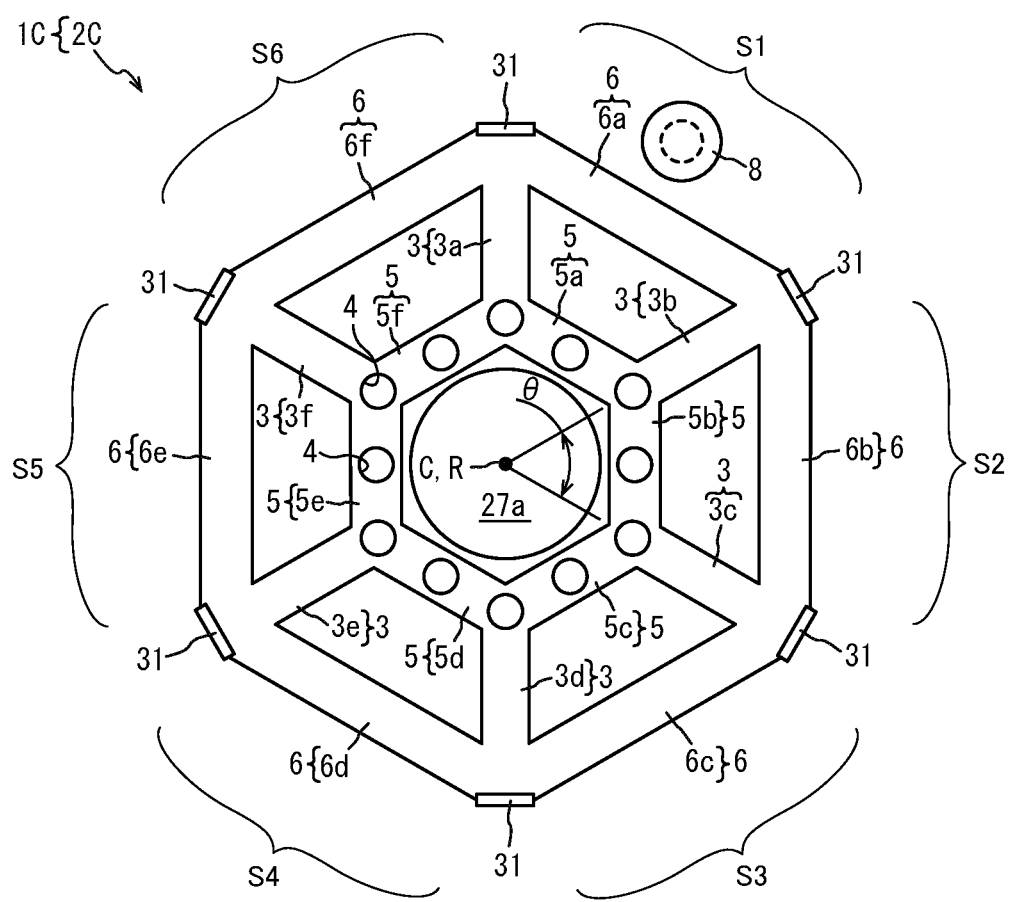
FIG. 9 is a plan view of a rotation-restricting-mechanism-rotating-body according to the fourth embodiment of the present teaching.

A rotation restricting member 1C according to a fourth embodiment of the present teaching will now be described with reference to FIG. 8 and FIG. 9. FIG. 8 is a side view of the rotation restricting mechanism 1C according to the fourth embodiment of the present teaching. FIG. 9 is a plan view of a rotation-restricting-mechanism-rotating-body 2C according to the fourth embodiment of the present teaching.

As shown in FIG. 8, the rotation restricting mechanism 1C includes the rotation-restricting-mechanism-rotating-body 2C, the engaging pin 8 and the solenoid 10. The rotation restricting mechanism 1C restricts rotation of the rotation shaft 27a of the motor 27 by causing the engaging pin 8 to engage with the rotation-restricting-mechanism-rotating-body 2C that rotates integrally with the rotation shaft 27a of the motor 27.

As shown in FIG. 8 and FIG. 9, the rotation-restricting-mechanism-rotating-body 2C is a frame-like member rotating integrally with the rotation shaft 27a of the motor 27. The rotation-restricting-mechanism-rotating-body 2C is of a polygonal shape (a hexagon in an example of FIG. 9) when viewed in the axial direction of the rotation shaft 27a. The rotation-restricting-mechanism-rotating-body 2C includes the plurality of beam-shaped radial-support parts 3, the plurality of beam-shaped first-circumferential-connecting parts 5, the plurality of beam-shaped second-circumferential-connecting parts 6, and plurality of engaging protrusions 31.

The plurality of engaging protrusions 31 extend in the axial direction of the rotation axis R of the rotation-restricting-mechanism-rotating-body 2C from the respective radial-support parts 3 so as to be engageable with the engaging pin 8. Specifically, the plurality of engaging protrusions 31 are so formed to extend from the outer end portions of the plurality of radial-support parts 3, in the direction of the other end portion of the rotation shaft 27a of the motor 27, the shaft center of the rotation shaft 27a being coincident with the rotation axis R. Thus, the plurality of engaging protrusions 31 are provided at equal intervals in the circumferential direction in the rotation-restricting-mechanism-rotating-body 2C.

In this embodiment, the plurality of engaging portions 31 are respectively bent in the direction of the other end portion of the rotation shaft 27a of the motor 27. Furthermore, the plurality of engaging protrusions 31 are so formed to extend in the axial direction of the rotation axis R of the rotation-restricting-mechanism-rotating-body 2C from the outer ends of the plurality of second-circumferential-connecting parts 6. The engaging protrusions 31 extend in the direction along the rotation axis R so as to be capable of engaging with the engaging pin 8 and thereby restricting rotation of the rotation-restricting-mechanism-rotating-body 2C.

The plurality of engaging protrusions 31 extend in the axial direction of the rotation axis R of the rotation-restricting-mechanism-rotating-body 2C as described above, so that a maximum radius of the rotation-restricting-mechanism-rotating-body 2C is a distance from the rotation axis R of the rotation-restricting-mechanism-rotating-body 2C to the outer end of each of the second-circumferential-connecting parts 6. Accordingly, the maximum radius of the rotation-restricting-mechanism-rotating-body 2C is less than that in a configuration where a plurality of engaging protrusions extend in the radial direction.

As described above, it is possible to reduce the maximum radius of the rotation-restricting-mechanism-rotating-body 2C with the plurality of engaging protrusions 31 extending in the axial direction of the rotation axis R. The rotation-restricting-mechanism-rotating-body 2C can also enhance design flexibility of the engaging pin 8 that engages with any one of the plurality of engaging protrusions 31. Accordingly, the rotation-restricting-mechanism-rotating-body 2C can expand the use environment of the rotation restricting mechanism 1C that restricts rotation by the engagement of the plurality of engaging protrusions 31.

As described above, the plurality of engaging protrusions 31 extend in the axial direction of the rotation axis R of the rotation-restricting-mechanism-rotating-body 2C, so that, as compared with a configuration where engaging protrusions extend in the radial direction of a rotation-restricting-mechanism-rotating-body, it is possible to provide a larger contact surface contacted by the engaging pin 8 in the rotation-restricting-mechanism-rotating-body 2C, while reducing a thickness of the rotation-restricting-mechanism-rotating-body 2C. This can reduce stress concentration in the rotation-restricting-mechanism-rotating-body 2C caused when the rotation-restricting-mechanism-rotating-body 2C engages with the engaging pin 8.

The configuration of the rotation-restricting-mechanism-rotating-body 2C except the engaging protrusions 31 is similar to that of the rotation-restricting-mechanism-rotating-body 2 according to the first embodiment. Thus, the configuration of the rotation-restricting-mechanism-rotating-body 2C except the engaging protrusions 31 can achieve similar effect to that of the rotation-restricting-mechanism-rotating-body 2 according to the first embodiment.

<Rotation-Restricting-Mechanism-Rotating-Body 2D According to Modification of Fourth Embodiment>

In the rotation-restricting-mechanism-rotating-body 2C according to the fourth embodiment, the plurality of radial-support parts 3 are bent in the axial direction of the rotation axis R of the rotation-restricting-mechanism-rotating-body 2C to thereby form the plurality of engaging protrusions 31.

However, the configuration of the rotation-restricting-mechanism-rotating-body is not limited to the above-described configuration.

Figure 10:
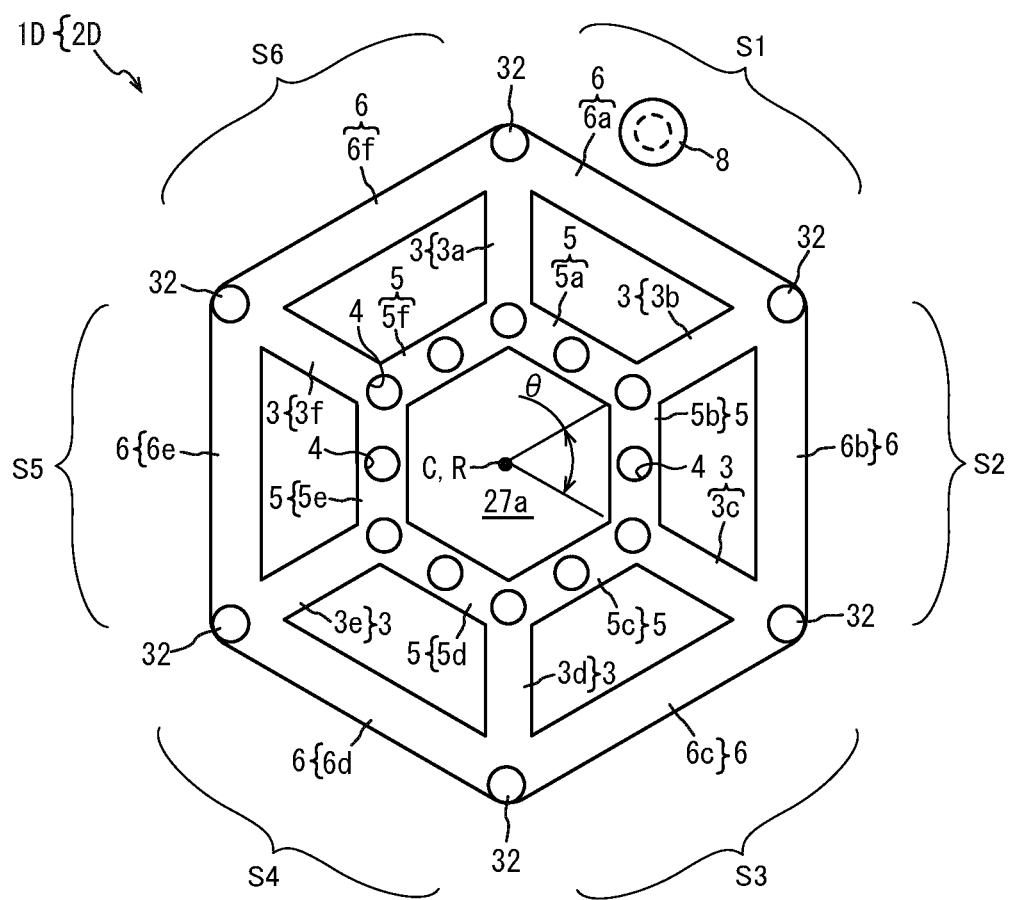
FIG. 10 is a plan view of a rotation-restricting-mechanism-rotating-body according to a modification of the fourth embodiment of the present teaching.

FIG. 10 is a plan view of a rotation-restricting-mechanism-rotating-body 2D according to a modification of the fourth embodiment of the present teaching. As shown in FIG. 10, the rotation-restricting-mechanism-rotating-body 2D of a rotation restricting mechanism 1D has a plurality of columnar-shaped rotary engaging pins 32 in the outer end portions of the plurality of radial-support parts 3 for example, as engaging protrusions. The plurality of rotary engaging pins 32 are provided such that they extend in one direction or the other direction along the rotation axis R of the rotation-restricting-mechanism-rotating-body 2D from the outer end portions of the plurality of radial-support parts 3. The plurality of rotary engaging pins 32 are provided at equal intervals in the circumferential direction in the rotation-restricting-mechanism-rotating-body 2D.

This can achieve similar effect to that of the fourth embodiment described above.

Fifth Embodiment

<Actuator 26A Including Engaging Pin 33 With Impact Reducer 33b>

Figure 11:
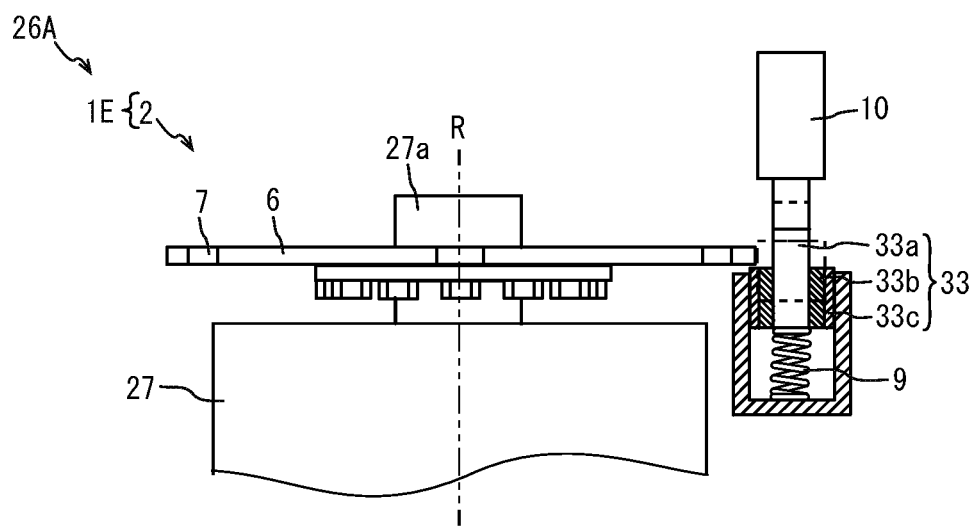
FIG. 11 is a side view of an actuator including a rotation restricting mechanism according to a fifth embodiment of the present teaching.
Figure 12:
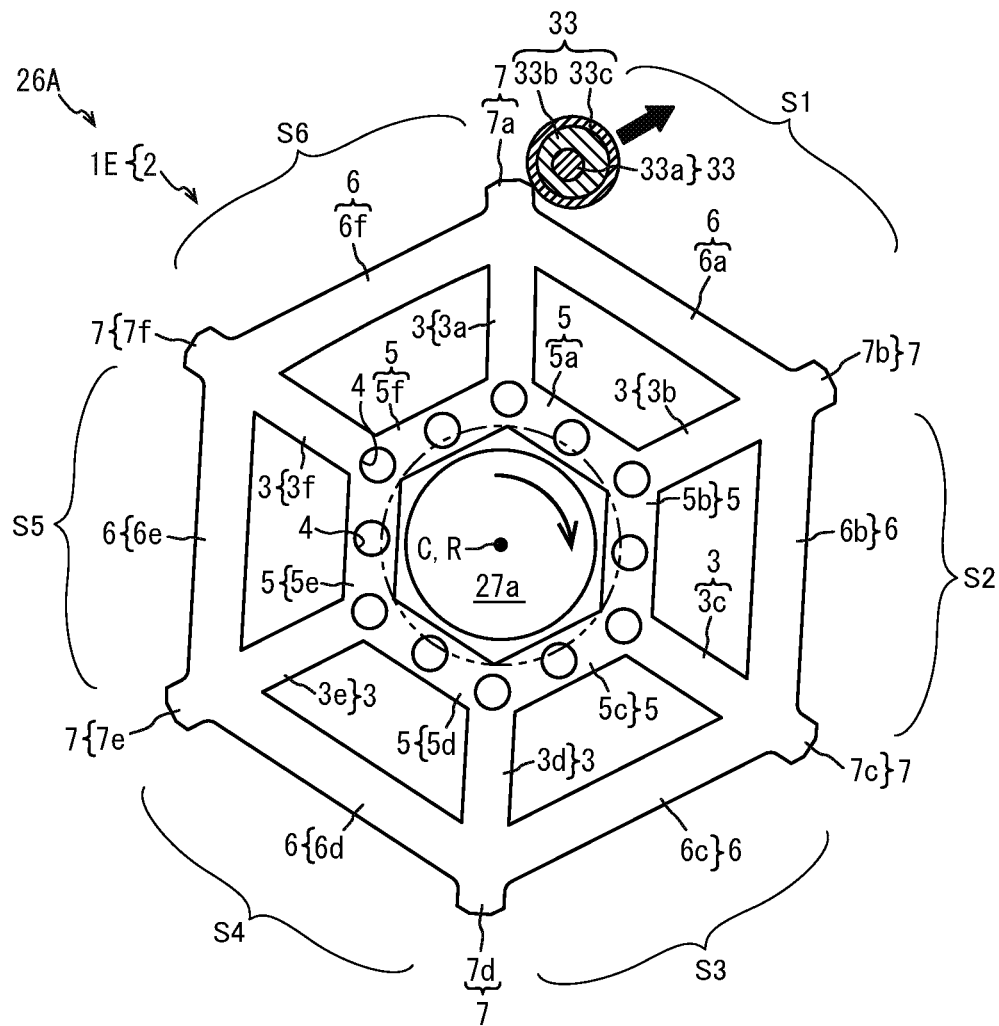
FIG. 12 is a plan view showing an elastic deformation state of an engaging pin when the engaging pin makes contact with a rotating body for a rotation restricting mechanism in the actuator according to the fifth embodiment of the present teaching.

An actuator 26A including a rotation restricting mechanism 1E according to a fifth embodiment of the present teaching will now be described with reference to FIG. 11 and FIG. 12. FIG. 11 is a side view of the actuator including the rotation restricting mechanism 1E according to the fifth embodiment of the present teaching. FIG. 12 is a plan view illustrating an elastic deformation state of an engaging pin 33 when the engaging pin 33 makes contact with the rotation-restricting-mechanism-rotating-body 2 of the actuator 26A according to the fifth embodiment of the present teaching.

As shown in FIG. 11, the actuator 26A includes the motor 27, the rotation restricting mechanism 1E, the absolute encoder, and the driving unit that is a computer for controlling the motor 27. The configurations of the absolute encoder and the driving unit are similar to those shown in FIG. 6.

The rotation restricting mechanism 1E restricts rotation of the rotation shaft 27a of the motor 27. The rotation restricting mechanism 1E limits the rotation of the rotation shaft 27a of the motor 27 by mechanical engagement. The rotation restricting mechanism 1E includes the rotation-restricting-mechanism-rotating-body 2, the engaging pin 33 and the solenoid 10. The rotation restricting mechanism 1E restricts the rotation of the rotation shaft 27a of the motor 27 by causing the engaging pin 33 to engage with the rotation-restricting-mechanism-rotating-body 2 that rotates integrally with the rotation shaft 27a of the motor 27.

The engaging pin 33 is a member for restricting rotation of the rotation-restricting-mechanism-rotating-body 2. The engaging pin 33 is supported by a portion not rotating in conjunction with the motor 27 and the rotation-restricting-mechanism-rotating-body 2, such as the housing of the motor 27. The engaging pin 33 includes a base 33a, an impact reducer 33b, and a contact part 33c.

The base 33a is a member for supporting the impact reducer 33b and the contact part 33c. The base 33a is formed in a columnar shape, for example. The solenoid 10 is disposed at one end portion in the axial direction of the base 33a. The spring 9 is disposed at the other end portion in the axial direction of the base 33a. The base 33a is configured to be movable in the axial direction. The base 33a is so disposed that its axis is parallel to the rotation axis R of the rotation-restricting-mechanism-rotating-body 2.

The impact reducer 33b is a member for absorbing an impact force transmitted via the contact part 33c. The impact reducer 33b is made of synthetic rubber that is an elastic body, or the like. The impact reducer 33b is formed in a hollow cylindrical shape, for example, to allow the base 33a to be inserted therein. The impact reducer 33b is provided on an outer circumferential surface of the base 33a. The impact reducer 33b has a thickness with which an impact force applied by the contact of an engaging protrusion 7 with the contact part 33c can be absorbed to some degree.

The contact part 33c is a member for making contact with the plurality of engaging protrusions 7 of the rotation-restricting-mechanism-rotating-body 2. The contact part 33c is formed in a hollow cylindrical shape, for example, to allow the impact reducer 33b to be inserted therein. The contact part 33c is so provided to cover an outer circumferential surface of the impact reducer 33b. That is, the contact part 33c prevents direct contact of the engaging protrusions 7 with the impact reducer 33b to thereby protect the impact reducer 33b.

The engaging pin 33 with the configuration as described above is so configured that the base 33a, the impact reducer 33b and the contact part 33c can be moved integrally in the axial direction by the solenoid 10 and the spring 9. The engaging pin 33 is changed from either one of a restriction position (indicated by an alternate long and two short dashes line) or an open position (indicated by a solid line) to the other by the solenoid 10, where the restriction position is a position at which the contact part 33c makes contact with the plurality of engaging protrusions 7 of the rotation-restricting-mechanism-rotating-body 2, while the open position is a position at which the contact part 33c is free of contact with the engaging protrusions 7. A force is applied in the axial direction to the engaging pin 33 by the spring 9 to be held at the restriction position.

As shown in FIG. 12, in a case where the position of the engaging pin 33 is changed to the restriction position, the rotation restricting mechanism 1E restricts a rotation angle range of the rotation-restricting-mechanism-rotating-body 2 from an angle at which one engaging protrusion 7 makes contact with the contact part 33c of the engaging pin 33 to an angle at which another engaging protrusion 7 adjacent to the one engaging protrusion 7 makes contact with the contact part 33c.

In a case where the engaging pin 33 is changed to the restriction position in the first section S1 of the rotation-restricting-mechanism-rotating-body 2 rotating in the one circumferential direction (see the solid arrow), the contact part 33c of the engaging pin 33 makes contact with the first engaging protrusion 7a of the rotation-restricting-mechanism-rotating-body 2. This causes an impact force to be applied to the contact surface 33c from the first engaging protrusion 7a. At that time, in the engaging pin 33, the impact reducer 33b is elastically deformed between the base 33a and the contact part 33c (see the black-filled arrow). The engaging pin 33 absorbs the impact force received from the first engaging protrusion 7a, as well as reduces an amount of elastic deformation of the first engaging protrusion 7a as compared with a case where no impact reducer 33b is provided. Accordingly, the rotation restricting mechanism 1E suppresses stresses occurring in the rotation-restricting-mechanism-rotating-body 2 and the engaging pin 33 by the engaging pin 33 having the impact reducer 33b.

The actuator 26A including the rotation restricting mechanism 1E restricts rotation of the rotation-restricting-mechanism-rotating-body 2 of the rotation restricting mechanism 1E, thereby restricting rotation of the rotation shaft 27a to which the rotation-restricting-mechanism-rotating-body 2 is connected. At that time, the stresses occurring in the engaging pin 33 and the rotation-restricting-mechanism-rotating-body 2 are suppressed. Thus, the actuator 26A can be used as an actuator for the S-axis rotary joint 14 that the strongest force acts on, out of the rotary joints of respective axes in the multi-joint-robot-arm device 11. Accordingly, the actuator 26A can expand the use environment of the rotation restricting mechanism 1E that restricts rotation by the engagement of the plurality of engaging protrusions 7.

The impact reducer 33b provided to the engaging pin 33 between the contact part 33c and the base 33a as in this embodiment can also reduce noise and vibration caused by the engagement of the rotation-restricting-mechanism-rotating-body 2 with the engaging pin 33.

Similarly to the first embodiment, an interval between mutually adjacent engaging protrusions 7 out of the plurality of engaging protrusions 7 in this embodiment is also larger than the sum of a diameter of the columnar-shaped engaging pin 33 extending in the axial direction when viewed in the axial direction (the maximum dimension in the circumferential direction) and a width of the engaging protrusion 7 in the circumferential direction.

Sixth Embodiment

<Actuator 26B Including Rotation-Restricting-Mechanism-Rotating-Body 2F With Rotation Impact Reducer 34a>

Figure 13:
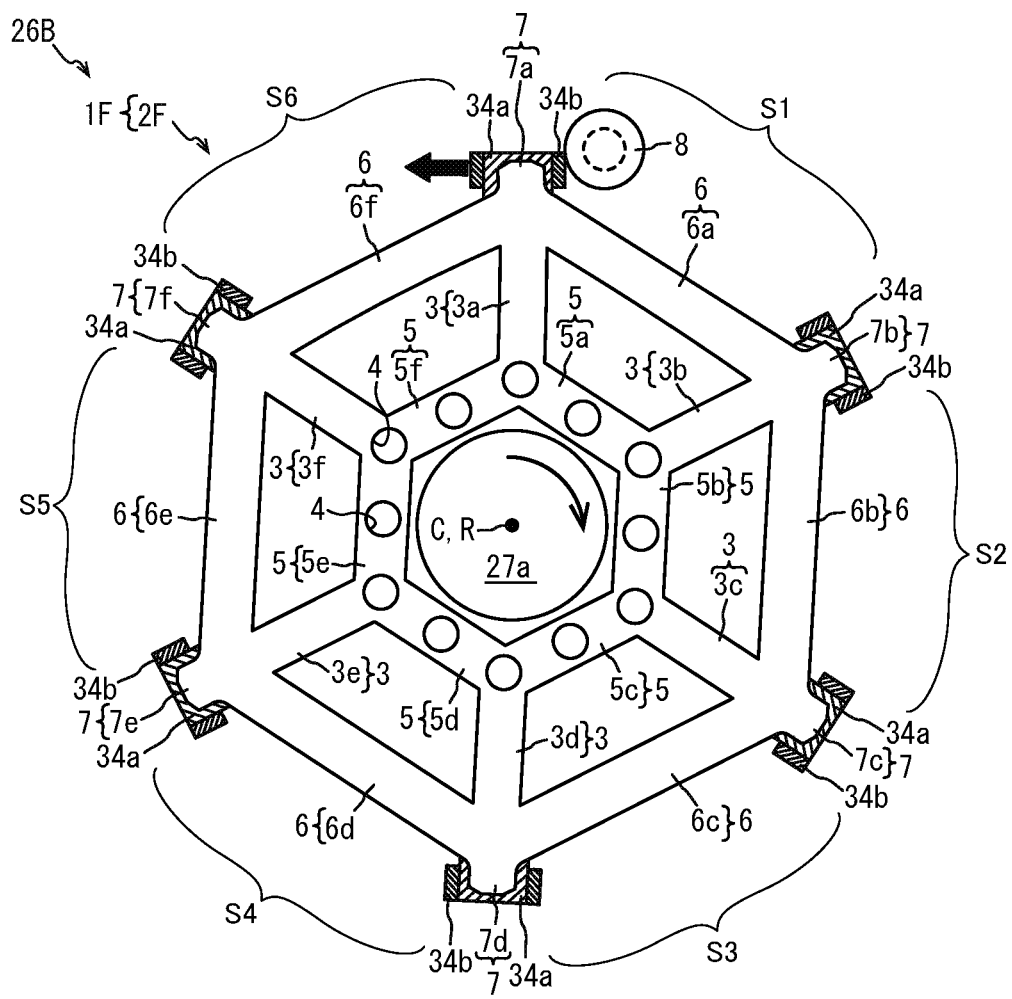
FIG. 13 is a plan view showing an elastic deformation state of a rotation impact reducer when an engaging pin makes contact with a rotating body for a rotation restricting mechanism in an actuator according to a sixth embodiment of the present teaching.

An actuator 26B including a rotation restricting mechanism 1F according to a sixth embodiment of the present teaching will now be described with reference to FIG. 13. FIG. 13 is a plan view illustrating an elastic deformation state of a rotation contact part 34b when the engaging pin 8 makes contact with a rotation-restriction-mechanism rotating body 2F in the actuator according to the sixth embodiment of the present teaching.

As shown in FIG. 13, the actuator 26B includes the motor, the rotation restricting mechanism 1F, the absolute encoder, and the driving unit that is a computer for controlling the motor 27. The configurations of the motor, the absolute encoder and the driving unit are similar to those shown in FIG. 6.

The rotation restricting mechanism 1F restricts rotation of the rotation shaft 27a of the motor 27. In this embodiment, the rotation restricting mechanism 1F includes the rotation-restricting-mechanism-rotating-body 2F, the engaging pin 8 and the solenoid. The configuration of the solenoid is similar to that shown in FIG. 6.

The plurality of engaging protrusions 7 of the rotation-restricting-mechanism-rotating-body 2F have a plurality of rotation impact reducers 34a and a plurality of rotation contact parts 34b.

The plurality of rotation impact reducers 34a are members for absorbing impact forces transmitted from the rotation contact parts 34b. The plurality of rotation impact reducers 34a are made of synthetic rubber that is an elastic body, or the like. Each of the rotation impact reducers 34a is provided to each of the engaging protrusions 7. The plurality of rotation impact reducers 34a are so provided to cover the plurality of engaging protrusions 7. Each of the rotation impact reducers 34a has a thickness with which an impact force applied by the engaging pin 8 can be absorbed to some degree.

The plurality of rotation contact parts 34b make contact with the engaging pin 8. The plurality of rotation contact parts 34b are so provided to cover the plurality of rotation impact reducers 34a. That is, the rotation contact parts 34b prevent the contact of the engaging pin 8 with the rotation impact reducers 34a to thereby protect the rotation impact reducers 34a.

In a case where the engaging pin 8 is changed to the restriction position in the first section S1 of the rotation-restricting-mechanism-rotating-body 2F rotating in the one circumferential direction (see the solid arrow), the engaging pin 8 makes contact with the rotation contact part 34b provided on the first engaging protrusion 7a. This causes an impact force to be applied to the rotation contact part 34b from the first engaging pin 8. At that time, in the first engaging protrusion 7a, the rotation impact reducer 34a is elastically deformed (see the black-filled arrow), so that the impact force applied from the engaging pin 8 is reduced. Accordingly, the rotation restricting mechanism 1F suppresses the stresses occurring in the rotation-restricting-mechanism-rotating-body 2F and the engaging pin 8 by the rotation impact reducer 34a.

In the actuator 26B including the rotation restricting mechanism 1F, the stresses occurring in the engaging pin 8 and the rotation-restricting-mechanism-rotating-body 2F are suppressed. Thus, the actuator 26B can expand the use environment of the rotation restricting mechanism 1F that restricts rotation by the engagement of the engaging protrusions 7.

The rotation impact reducers 34a provided to the engaging protrusions 7 of the rotation-restricting-mechanism-rotating-body 2F, as in this embodiment, can also reduce noise and vibration caused by the engagement of the rotation-restricting-mechanism-rotating-body 2F with the engaging pin 8.

The configuration of the rotation-restricting-mechanism-rotating-body 2F except the rotation impact reducers 34a and the rotation contact parts 34b is similar to that of the rotation-restricting-mechanism-rotating-body 2 according to the first embodiment. Thus, the configuration of the rotation-restricting-mechanism-rotating-body 2F except the rotation impact reducers 34a and the rotation contact parts 34b can achieve similar effect to that of the rotation-restricting-mechanism-rotating-body 2 according to the first embodiment.

Other Embodiments

In the second embodiment described above, the multi-joint robot arm 12 that is a six-axis vertical multi join robot arm is configured, as an example, such that the S-axis rotary joint 14, the L-axis rotary joint 16, the U-axis rotary joint 18, the R-axis rotary joint 20, the B-axis rotary joint 22, and the T-axis rotary joint 24 are connected in series via links, but is not limited thereto. As for the number of connected axes, a connection order in which motor units M of the axes are connected, axial directions when the axes are connected, or the like, any other configuration than that of the second embodiment described above may be used if the configuration can function as a multi joint robot arm.

In the second embodiment described above, the actuator 26 is used as the rotary joint of each axis of the multi joint robot arm 12. However, a configuration of the actuator 26 is not limited to the configurations of the above-described embodiments. For example, the actuator 26 may be applied to a device, such as an XY table, a vertical conveyance device, or the like, that requires position control, or the like. The actuator 26 may not include the speed reducer 25.

In the second embodiment described above, the actuator 26 is configured as an electromechanical integrated configuration in which the motor 27, the speed reducer 25, the absolute encoder 28, and the driving unit 29 are provided in each of the case 15, the case 19, and the case 23 of the multi-joint robot arm 12. However, the configuration of the actuator 26 is not limited to that of the above-described second embodiment. For example, the actuator may be configured such that the driving unit is disposed outside the cases of the multi joint robot arm.

In all of the embodiments described above, the rotation-restricting-mechanism-rotating-body 2, the rotation-restricting-mechanism-rotating-body 2B, the rotation-restricting-mechanism-rotating-body 2C, the rotation-restricting-mechanism-rotating-body 2D, and the rotation-restricting-mechanism-rotating-body 2F (hereinafter referred to simply as "the respective rotation-restricting-mechanism rotating bodies") are made of stainless steel. The respective rotation-restricting-mechanism rotating bodies, however, may be made of other materials, such as iron subjected to rust-poof treatment, aluminum alloys, ceramics, carbon fiber reinforced plastics, or glass fiber reinforced plastics as long as they are materials that have rust-proof property and can resist an impact force received from the engaging pin 8.

In all of the embodiments described above, the respective rotation-restricting-mechanism rotating bodies have a hexagonal shape when viewed in the axial direction of the rotation shaft 27a. However, the respective rotation-restricting-mechanism rotating bodies may have other shapes as long as they are a polygon.

In all of the embodiments described above, the six engaging protrusions 7, 31 or the rotary engaging pins 32 in the respective rotation-restricting-mechanism rotating bodies, are formed at equal intervals in the circumferential direction. However, the configurations of the respective rotation-restricting-mechanism rotating bodies are not limited to the configurations of the above-described embodiments. For example, the number of the engaging protrusions or the rotary engaging pins may be numbers other than six. The plurality of engaging protrusions or the plurality of rotary engaging pins may not be formed at equal intervals in the circumferential direction.

In all of the embodiments described above, the first-circumferential-connecting parts 5 and the second-circumferential-connecting parts 6, in the respective rotation-restricting-mechanism rotating bodies, connect mutually adjacent radial-support parts 3. However, the configurations of the respective rotation-restricting-mechanism rotating bodies are not limited to the above-described configurations. For example, the respective rotation-restricting-mechanism rotating bodies may further include the third or more circumferential-connecting parts to connect mutually adjacent radial-support parts 3.

In all of the embodiments described above, the plurality of radial-support parts 3, in the respective rotation-restricting-mechanism rotating bodies, are disposed in a radial pattern around one point as the radial center C. However, the configurations of the respective rotation-restricting-mechanism rotating bodies are not limited to the above-described configurations. For example, in the respective rotation-restricting-mechanism rotating bodies, the plurality of radial-support parts may be divided into a plurality of groups having different radial centers, and radial-support parts of each group may be disposed in a radial pattern around its radial center.

In all of the embodiments described above, the plurality of radial-support parts 3, in the respective rotation-restricting-mechanism rotating bodies, are disposed in a radial pattern with the center angles θ each made by mutually adjacent radial-support parts 3 at 60 degrees. However, the configurations of the respective rotation-restricting-mechanism rotating bodies are not limited to the above-described configurations. For example, the center angles each made by mutually adjacent radial-support parts are not limited to 60 degrees as long as the plurality of radial-support parts are disposed in a radial pattern.

In all of the embodiments described above, the first-circumferential-connecting parts 5, in the respective rotation-restricting-mechanism rotating bodies, connect mutually adjacent radial-support parts 3 so as to form a polygonal shape. However, the first-circumferential-connecting parts may connect mutually adjacent radial-support parts so as to form an annular shape.

In all of the embodiments described above, the rotation restricting mechanism 1, the rotation restricting mechanism 1B, the rotation restricting mechanism 1C, the rotation restricting mechanism 1D, the rotation restricting mechanism 1E, and the rotation restricting mechanism 1F (hereinafter referred to simply as "the respective rotation restricting mechanisms") are so configured that the engaging pin 8 or 33 engages with the engaging protrusions 7 of the respective rotation restricting mechanisms. However, the configurations of the respective rotation restricting mechanisms are not limited to the above-described configurations. For example, in the respective rotation restricting mechanisms, the engaging pin 8 or 33 may engage with the plurality of radial-support parts 3 between the plurality of first-circumferential-connecting parts 5 and the plurality of second-circumferential-connecting parts 6.

In all of the embodiments described above, the engaging pins 8 and 33 are made of stainless steel. However, the configurations of the engaging pins 8 and 33 are not limited to the configurations of the above-described embodiments. For example, the engaging pins 8 and 33 may be made of other materials, such as iron subjected to rust-poof treatment, aluminum alloys, ceramics, carbon fiber reinforced plastics, or glass fiber reinforced plastics as long as they are materials that have rust-proof property and can resist an impact force caused by the contact with the respective rotation-restricting-mechanism rotating bodies.

In all of the embodiments described above, the engaging pins 8 and 33 are so disposed to move along their axes that are parallel to the rotation axes of the rotation-restricting-mechanism-rotating-bodies. However, the configurations of the engaging pins 8 and 33 are not limited to the configurations of the above-described embodiments. It suffices that the engaging pins 8 and 33 are configured to move in thickness directions of the rotation-restricting-mechanism-rotating-bodies. For example, the engaging pins 8 and 33 may be configured to move along their axes that are diagonal to the rotation axes of the rotation-restricting-mechanism-rotating-bodies.

In all of the embodiments described above, the interval Ls between mutually adjacent engaging protrusions 7 out of the plurality of engaging protrusions 7 is larger than the sum of the diameter D of the engaging pin 8, 33 when viewed in the axial direction and the width W of the engaging protrusion 7 in the circumferential direction. However, the interval between mutually adjacent engaging protrusions may be the same as the sum of the diameter of the engaging pin 8, 33 and the width W of the engaging protrusion 7 in the circumferential direction, or smaller than the sum.

In all of the embodiments described above, the engaging pins 8 and 33 have a columnar shape. However, the engaging pins may have a polygonal pillar shape such as a square pole, or have shapes other than a pillar shape, such as spherical or polyhedral shape. In this case, the diameter of the engaging pin, in the above-described relationship, may be substituted with the maximum dimension of the engaging pin in the circumferential direction when the engaging pin is viewed in the axial direction.

In the fifth and sixth embodiments described above, the impact reducer 33b and the rotation impact reducers 34a are made of synthetic rubber. However, the configurations of the impact reducer 33b and the rotation impact reducers 34a are not limited to the configurations of the above-described fifth and sixth embodiments. For example, the impact reducer 33b and the rotation impact reducers 34a may be made of elastic resin, or the like. The impact reducer 33b and the rotation impact reducers 34a may have an elastic configuration such as a leaf spring.

In the fifth embodiment described above, the rotation restricting mechanism 1E includes the impact reducer 33b provided to the engaging pin 33. In the sixth embodiment described above, the rotation restricting mechanism 1F includes the rotation impact reducers 34a provided to the plurality of engaging protrusions 7 of the rotation-restricting-mechanism-rotating-body 2F. However, the configurations of the rotation restricting mechanisms 1E and 1F are not limited to the configurations of the above-described embodiments. For example, in the rotation restricting mechanism 1E, an impact reducer may be provided to both of the plurality of engaging protrusions 7 of the rotation-restricting-mechanism-rotating-body 2 and the engaging pin 33. In the rotation restricting mechanism 1F, an impact reducer may be provided to both of the plurality of engaging protrusions 7 of the rotation-restricting-mechanism-rotating-body 2F and the engaging pin 8.

The embodiments of the present teaching have been described above, but the above-described embodiments are merely illustrative examples of preferred embodiments of the present teaching. Therefore, the present teaching is not limited to the above-described embodiments and the above-described embodiments can be appropriately modified and implemented without departing from the gist of the teaching.

INDUSTRIAL APPLICABILITY

The present teaching is applicable to a rotation-restricting-mechanism-rotating-body, and an actuator that includes a rotation restricting mechanism having the rotation-restricting-mechanism-rotating-body.

REFERENCE SIGNS LIST 1, 1B, 1C, 1D, 1E, 1F rotation restricting mechanism
2, 2B, 2C, 2D, 2F, 200 rotation-restricting-mechanism-rotating-body (rotating body for rotation restricting mechanism)
3 radial-support part
4 fixed part
5 first-circumferential-connecting part
6 second-circumferential-connecting part
7, 31 engaging protrusion
8, 33 engaging pin (fixed restricting member)
33a base
33b impact reducer
33c contact part
34a rotation impact reducer
34b rotation contact part
9 spring
10 solenoid
11 multi-joint-robot-arm device
26, 26A, 26B actuator
27 motor
27a rotation shaft
100 rotation-restricting-mechanism control device
110 engaging-protrusion-position detector
120 engaging-pin-movement controller
130 engaging-pin-moving device
R rotation axis

The invention claimed is:

1. A rotation restricting mechanism, comprising:
a rotation-restricting-mechanism-rotating-body; and
a fixed restricting member configured to restrict rotation of the rotation-restricting-mechanism-rotating-body, wherein
the rotation-restricting-mechanism-rotating-body includes:
a plurality of radial-support parts, each extending in a radial direction, and having an inner end portion and an outer end portion respectively at an inner end and an outer end of said each radial-support part in the radial direction, the inner end portions of the radial-support parts being connected to a rotator that restricts rotation, each of the radial-support parts being of a beam shape;
a plurality of first-circumferential-connecting parts, each connecting the inner end portions of two of the radial-support parts that are mutually adjacent, each of the first-circumferential-connecting parts being of a beam shape;
a plurality of second-circumferential-connecting parts, each connecting the outer end portions of two of the radial-support parts that are mutually adjacent, each of the second-circumferential-connecting parts being of a beam shape, the plurality of second-circumferential-connecting parts forming a polygonal shape; and
a plurality of engaging protrusions, respectively extending outward in the radial direction from the outer end portions of the plurality of radial-support parts, the plurality of engaging protrusions being so formed that an interval between the engaging protrusions that are mutually adjacent in a circumferential direction out of the plurality of engaging protrusions has a distance that, when the fixed restricting member is at a position by which the rotation of the rotation-restricting-mechanism-rotating-body is restrictable, enables relative movement of the fixed restricting member in the circumferential direction between the adjacent engaging protrusions; and
the fixed restricting member is configured to engage with the rotation-restricting-mechanism-rotating-body by moving in an axial direction of the rotation-restricting-mechanism-rotating-body.

2. The rotation restricting mechanism according to claim 1, wherein the polygonal shape of the rotation-restricting-mechanism-rotating-body is a triangle, a square, a pentagon, or a hexagon.

3. The rotation restricting mechanism according to claim 1, wherein the interval between said two of the engaging protrusions that are mutually adjacent in the rotation-restricting-mechanism-rotating-body is larger than a sum of
a maximum dimension of the fixed restricting member in the circumferential direction when the fixed restricting member is viewed in the axial direction and a width of each of the engaging protrusions in the circumferential direction.

4. The rotation restricting mechanism according to claim 1, wherein each of the engaging protrusions in the rotation-restricting-mechanism-rotating-body is so formed to extend in the axial direction from the outer end portion of one of the radial-support parts.

5. The rotation restricting mechanism according to claim 1, wherein a width of each of the first-circumferential-connecting parts and each of the second-circumferential-connecting parts in the rotation-restricting-mechanism-rotating-body, in the radial direction, is smaller than an interval in the radial direction between one of the first-circumferential-connecting parts and one of the second-circumferential-connecting parts that are adjacent to each other in the radial direction.

6. An actuator including the rotation restricting mechanism according to claim 1, the actuator comprising:
   the rotator;
   an engaging pin that is the fixed restricting member;
   an engaging-protrusion-position detector that detects a position of at least one of the engaging protrusions; and
   an engaging-pin-moving device that moves the engaging pin in the axial direction with respect to the rotation-restricting-mechanism-rotating-body, in accordance with the position of the at least one of the engaging protrusions detected by the engaging-protrusion-position detector.

7. An actuator including the rotation restricting mechanism according to claim 1, the actuator comprising:
   the rotator; and
   an engaging pin that is the fixed restricting member, wherein
   the engaging pin includes an impact reducer that reduces an impact caused by contact with one of the engaging protrusions,
   the rotation-restricting-mechanism-rotating-body is connected to a rotation shaft of the rotator, and
   rotation of the rotation shaft is restricted by engagement of one of the engaging protrusions with the engaging pin.

8. An actuator including the rotation restricting mechanism according to claim 1, the actuator comprising:
   the rotator; and
   an engaging pin that is the fixed restricting member, wherein
   the rotation-restricting-mechanism-rotating-body includes a rotation impact reducer that reduces an impact caused by contact with the engaging pin,
   the rotation-restricting-mechanism-rotating-body is connected to a rotation shaft of the rotator, and
   rotation of the rotation shaft is restricted by engagement of one of the engaging protrusions with the engaging pin.

* * * * *